US012320918B2

United States Patent
Lao et al.

(10) Patent No.: US 12,320,918 B2
(45) Date of Patent: Jun. 3, 2025

(54) RADAR SYSTEM AND VEHICLE

(71) Applicant: Shenzhen Yinwang Intelligent Technologies Co., Ltd., Shenzhen (CN)

(72) Inventors: Dapeng Lao, Beijing (CN); Jinnan Liu, Shenzhen (CN); Ben Wang, Beijing (CN); Mu Zhou, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 17/581,176

(22) Filed: Jan. 21, 2022

(65) Prior Publication Data
US 2022/0146623 A1    May 12, 2022

Related U.S. Application Data

(63) Continuation of application No. PCT/CN2019/097087, filed on Jul. 22, 2019.

(51) Int. Cl.
*G01S 7/03* (2006.01)
*G01S 13/06* (2006.01)
(Continued)

(52) U.S. Cl.
CPC ............... *G01S 7/03* (2013.01); *G01S 13/06* (2013.01); *G01S 13/931* (2013.01); *G01S 2013/0245* (2013.01)

(58) Field of Classification Search
CPC .... G01S 7/03; G01S 13/06; G01S 2013/0245; G01S 13/931
See application file for complete search history.

(56) References Cited

U.S. PATENT DOCUMENTS 5,986,602 A    11/1999  Frink
9,869,762 B1 *  1/2018  Alland ................... H01Q 21/08
(Continued)

FOREIGN PATENT DOCUMENTS

CN        101697010 A      4/2010
CN        101950851 A      1/2011
(Continued)

OTHER PUBLICATIONS

Mietzner, J., et al., "Compact 3D Mimo Radar—Antenna Array Design and Experimental Results," Proceedings of the 14th European Radar Conference, Oct. 11-13, 2017, 4 pages.
(Continued)

*Primary Examiner* — Marcus E Windrich
(74) *Attorney, Agent, or Firm* — Conley Rose, P.C.

(57) ABSTRACT

A radar system includes a transmitter configured to transmit a radar signal; and a receiver configured to receive an echo signal obtained after the radar signal is reflected by a target, where a transmit antenna array of the transmitter and a receive antenna array of the receiver are used to form a virtual linear array and a virtual planar array, the virtual linear array includes a uniform linear array in a first direction, the virtual planar array includes a uniform planar array, and a first spacing between two adjacent array elements in the uniform linear array is less than a second spacing between two adjacent array elements in the first direction in the uniform planar array.

20 Claims, 16 Drawing Sheets

(51) Int. Cl.
*G01S 13/931* (2020.01)
*G01S 13/02* (2006.01)

(56) References Cited

U.S. PATENT DOCUMENTS

| | | | |
|---|---|---|---|
| 2010/0328157 A1 | 12/2010 | Culkin et al. | |
| 2012/0274499 A1 | 11/2012 | Chang | |
| 2013/0162475 A1 | 6/2013 | Blech et al. | |
| 2014/0043189 A1 | 2/2014 | Lee et al. | |
| 2015/0042507 A1 | 2/2015 | Jeong et al. | |
| 2015/0253420 A1 | 9/2015 | Alland | |
| 2016/0282450 A1 | 9/2016 | Kishigami et al. | |
| 2017/0082730 A1* | 3/2017 | Kishigami | H01Q 21/061 |
| 2017/0307744 A1 | 10/2017 | Loesch et al. | |
| 2017/0322295 A1 | 11/2017 | Loesch et al. | |
| 2018/0149736 A1* | 5/2018 | Alland | H01Q 21/28 |
| 2018/0159246 A1 | 6/2018 | Raphaeli et al. | |
| 2018/0166794 A1 | 6/2018 | Raphaeli et al. | |
| 2019/0115670 A1 | 4/2019 | Kishigami | |
| 2019/0137616 A1* | 5/2019 | Kishigami | G01S 13/48 |
| 2019/0195984 A1* | 6/2019 | Goda | G01S 13/931 |
| 2019/0339382 A1* | 11/2019 | Hess | H04B 7/0413 |
| 2021/0156982 A1* | 5/2021 | Stettiner | G01S 7/35 |
| 2022/0146623 A1 | 5/2022 | Lao et al. | |

FOREIGN PATENT DOCUMENTS

| | | |
|---|---|---|
| CN | 102521472 A | 6/2012 |
| CN | 103178356 A | 6/2013 |
| CN | 103235294 A | 8/2013 |
| CN | 103454631 A | 12/2013 |
| CN | 103901417 A | 7/2014 |
| CN | 104345311 A | 2/2015 |
| CN | 104614726 A | 5/2015 |
| CN | 104808201 A | 7/2015 |
| CN | 104849696 A | 8/2015 |
| CN | 105589058 A | 5/2016 |
| CN | 106054181 A | 10/2016 |
| CN | 106154245 A | 11/2016 |
| CN | 106546983 A | 3/2017 |
| CN | 106990385 A | 7/2017 |
| CN | 107356920 A | 11/2017 |
| CN | 107490788 A | 12/2017 |
| CN | 107611624 A | 1/2018 |
| CN | 109188386 A | 1/2019 |
| CN | 109343053 A | 2/2019 |
| CN | 109407072 A | 3/2019 |
| CN | 109411902 A | 3/2019 |
| CN | 109638437 A | 4/2019 |
| CN | 109659705 A | 4/2019 |
| CN | 112567262 B | 1/2022 |
| EP | 2916144 A1 | 9/2015 |
| JP | 2016180721 A | 10/2016 |
| JP | 2017032531 A | 2/2017 |
| JP | 2019084469 A | 6/2019 |
| JP | 2019086469 A | 6/2019 |
| KR | 20140021380 A | 2/2014 |
| WO | 2016045938 A1 | 3/2016 |
| WO | 2016164758 A1 | 10/2016 |
| WO | 2018165633 A1 | 9/2018 |

OTHER PUBLICATIONS

Jie, Y., "Research on Array Design and Sparse Robust Signal Processing Algorithms for MIMO Radar," Xidian University, Apr. 2016, with an English abstract, 175 pages.

Cetinkaya H., et al., "The Comparison of the Near Field Beam Patterns of ID-Cr MIMO and 2D-CR MIMO Arrays," 15th International Conference on Ground Penetrating Radar, GPR 2014, 5 pages.

Jia Jiemin et al., DBF Algorithm Simulation and realization based on FPGA, Electronic Engineering and Product World, Issue No. 05, May 4, 2016, with English abstract, 4 pages.

Wu Hua-ting et al., TwoD-DOA Estimation for MIMO Radar Based on Cross Array, Research on Informatization, vol. 37, No. 02, Apr. 20, 2011, with English abstract, 7 pages.

Tan Ya-yun, Zhang He, Zha Bing-ting, "Simulation of Underwater Laser Fuze Echo Based on Bidirectional Reflectance Distribution Function," Acta Photonica Sinica, vol. 45, No. 12, Dec. 2016, 6 pages.

* cited by examiner

RADAR SYSTEM AND VEHICLE

CROSS-REFERENCE TO RELATED APPLICATIONS

This is a continuation of International Patent Application No. PCT/CN2019/097087 filed on Jul. 22, 2019, the disclosure of which is hereby incorporated by reference in its entirety.

TECHNICAL FIELD

This disclosure relates to the field of sensor technologies, and in particular, to a radar system and a vehicle.

BACKGROUND

With development of an automated driving technology, there is a higher requirement for a sensing capability of a vehicle-mounted sensor. For a vehicle-mounted radar, to improve target measurement precision and target resolution, radar resolution is usually improved in three dimensions range resolution, velocity resolution, and angular resolution. The angular resolution may be improved by increasing a virtual aperture by using a multiple-input and multiple-output (MIMO) virtual array. In other words, a plurality of transmit channels and a plurality of receive channels are used to virtualize a larger array, to increase an antenna aperture to obtain higher angular resolution.

For example, an array solution used in the conventional technology may be shown in FIG. 1. In this solution, a transmit antenna array 1 and a transmit antenna array 2 each include 3*8 transmit array elements, to form 48 transmit channels, and a receive antenna array 1 and a receive antenna array 2 each include 1*24 receive array elements, to form 48 receive channels. In an antenna arrangement manner shown in FIG. 1, the transmit antenna arrays and the receive antenna arrays may be used to virtualize a uniform planar array including 48*48 virtual channels, as shown in FIG. 2. The uniform planar array shown in FIG. 2 includes 144*16 virtual channels. There are 24*6=144 virtual channels in a horizontal direction, and 8*2=16 virtual channels in a vertical direction.

According to the solution shown in FIG. 1, a virtual antenna array is a uniform planar array, and it is simple to match an angle in the horizontal direction and an angle in the vertical direction of the virtual antenna array. Therefore, to achieve high resolution in the horizontal direction and the vertical direction, a large quantity of transmit array elements and a large quantity of receive array elements need to be disposed. In case that a large quantity of antennas is disposed, design and processing difficulty is increased, and costs are also increased.

In conclusion, a radar system is required, so that when high angular resolution is obtained, a quantity of transmit array elements and a quantity of receive array elements are reduced, to reduce design and processing difficulty.

SUMMARY

Embodiments of this application provide a radar system and a vehicle, so that when high angular resolution is obtained, a quantity of transmit array elements and a quantity of receive array elements are reduced, to reduce design and processing difficulty.

According to a first aspect, an embodiment of this application provides a radar system. The radar system includes a transmitter configured to transmit a radar signal, and a receiver configured to receive an echo signal obtained after the radar signal is reflected by a target. A transmit antenna array of the transmitter and a receive antenna array of the receiver are used to form a virtual linear array and a virtual planar array, the virtual linear array includes a uniform linear array in a first direction, the virtual planar array includes a uniform planar array, and a first spacing between two adjacent array elements in the uniform linear array is less than a second spacing between two adjacent array elements in the first direction in the uniform planar array.

The radar signal is any one of a frequency-modulated continuous-wave (FMCW), multiple frequency-shift keying (MFSK), and a phase-modulated continuous-wave (PMCW). The echo signal may be used to determine a horizontal azimuth and a vertical azimuth of the target.

The first direction may be a horizontal direction or a vertical direction. If the first direction is the horizontal direction, the virtual linear array is used to determine a horizontal azimuth measurement value of the target, and the virtual planar array is used to determine a vertical azimuth measurement value and the horizontal azimuth measurement value of the target, or if the first direction is the vertical direction, the virtual linear array is used to determine a vertical azimuth measurement value of the target, and the virtual planar array is used to determine the vertical azimuth measurement value and a horizontal azimuth measurement value of the target. In accompanying drawings and examples of this application, an example in which the first direction is the horizontal direction is used for illustration.

In the radar system provided in the first aspect, because a dense uniform linear array may be used to ensure a large field of view (FOV) in the first direction, there may be a more accurate calculation result when an azimuth (for example, the horizontal azimuth) corresponding to the first direction is calculated by using the uniform linear array (in other words, an azimuth of the target is calculated based on an observation result obtained based on each array element in a virtual antenna array). In addition, the uniform linear array may meet an FOV requirement in the first direction, a large spacing may be set between array elements in the uniform planar array in the first direction (if there is a small FOV, aliasing may exist in directions of a plurality of angles within an FOV range of the uniform linear array), to obtain correct angle information in the first direction by using an FOV of the uniform linear array. In other words, an antenna array disposed corresponding to the uniform planar array may include only a small quantity of array elements, to reduce a quantity of transmit array elements and a quantity of receive array elements. When the uniform linear array and the uniform planar array have a same aperture in the first direction, obtained angular resolution of the uniform linear array and the uniform planar array in the first direction is the same. When an aperture of the uniform linear array in the first direction is greater than an aperture of the uniform planar array in the first direction, obtained angular resolution of the uniform linear array in the first direction is higher, and obtained higher angular information of the uniform linear array in the first direction may be substituted into the uniform planar array, to obtain angle information in a second direction through calculation (for example, may be the vertical direction).

Therefore, in the radar system provided in the first aspect, the transmit antenna array and the receive antenna array may be used to virtualize one virtual linear array and one virtual planar array. The virtual linear array and the virtual planar array have different array element density in the first direction (the first spacing is less than the second spacing). Therefore, when the azimuth corresponding to the first direction is separately calculated by using the virtual linear array and the virtual planar array, different FOVs may be obtained. An FOV of the virtual linear array in the first direction is greater than an FOV of the virtual planar array in the first direction, and a result of calculating the azimuth in the first direction by using the virtual linear array is more accurate. Therefore, when the azimuth of the target is determined based on observation results obtained based on the two arrays of the virtual linear array and the virtual planar array, matching may be performed between the different FOVs. Because a matching degree between the two virtual arrays is more complex than a matching degree between virtual antenna arrays in the conventional technology, a small quantity of antennas may be disposed in the transmitter and the receiver, to implement the virtual linear array and the virtual planar array in this application. In addition, because the matching degree between the virtual linear array and the virtual planar array is complex, high angular resolution may be obtained through calculation based on the two arrays. In other words, according to the solution provided in the first aspect, high resolution in the vertical azimuth and the horizontal azimuth of the target may be obtained through calculation by using a small quantity of transmit antennas and a small quantity of receive antennas, so that when angular resolution of the radar system is increased, design and processing difficulty of the antenna array is reduced, and costs of the radar system are reduced.

In one possible design, the first spacing is $d_1$, the second spacing is $d_2$, $d_1$ and $d_2$ meet the following relationship:

$$M*d_1=N*d_2.$$

Herein, M and N each are a positive integer, and M>N. According to this manner, engineering calculation may be simpler.

In one possible design, the first spacing is less than or equal to a half of a carrier wavelength of the radar signal. In this case, when the horizontal azimuth measurement value of the target is determined by using the virtual linear array, angle ambiguity does not exist. Therefore, there is a simpler calculation manner of determining the horizontal azimuth of the target.

In addition, the radar system provided in the first aspect may further include a processing unit, and the processing unit is configured to determine the horizontal azimuth and the vertical azimuth of the target based on the echo signal. The processing unit may determine the horizontal azimuth and the vertical azimuth of the target, to help the system determine a location of the target, and then perform a corresponding operation (for example, plan a route of automated driving) based on the location of the target.

Further, a manner in which the processing unit determines the horizontal azimuth and the vertical azimuth of the target may be separately determining, based on the echo signal, an observation result that is of the radar signal and that is obtained based on the virtual linear array and an observation result that is of the radar signal and that is obtained based on the virtual planar array, and determining the horizontal azimuth and the vertical azimuth of the target based on the observation result that is of the radar signal and that is obtained based on the virtual linear array and the observation result that is of the radar signal and that is obtained based on the virtual planar array. In other words, after the receive antenna array receives the echo signal, the processing unit may obtain, through calculation based on a signal received by each receive antenna in the receive antenna array, the observation result that is of the radar signal and that is obtained based on the virtual linear array and the observation result that is of the radar signal and that is obtained based on the virtual planar array. The two observation results may be used to calculate the horizontal azimuth and the vertical azimuth of the target.

In a possible design, the processing unit is further configured to determine a first candidate horizontal azimuth of the target based on the observation result that is of the radar signal and that is obtained based on the virtual linear array, determine a second candidate horizontal azimuth and a candidate vertical azimuth of the target based on the observation result that is of the radar signal and that is obtained based on the virtual planar array, and determine the horizontal azimuth and the vertical azimuth of the target based on the first candidate horizontal azimuth, the second candidate horizontal azimuth, and the candidate vertical azimuth. According to the foregoing solution, the horizontal azimuth and the vertical azimuth of the target may be determined by using observation results of the echo signal that are obtained based on the virtual linear array and the virtual planar array.

The processing unit may determine the first candidate horizontal azimuth in a digital beam forming (DBF) or fast Fourier transform (FFT) manner based on the observation result that is of the radar signal and that is obtained based on the virtual linear array.

Similarly, the processing unit may determine the second candidate horizontal azimuth and the candidate vertical azimuth in the DBF or FFT manner based on the observation result that is of the radar signal and that is obtained based on the virtual planar array.

When the horizontal azimuth measurement value of the target is determined by using the virtual linear array, angle ambiguity may exist. In other words, the first candidate horizontal azimuth may include a plurality of azimuths, and only some horizontal azimuths are real horizontal azimuths of the target. In addition, because there is a large spacing between virtual channels in the virtual planar array in the horizontal direction, the second candidate horizontal azimuth $\theta_2$ obtained based on only the virtual planar array is ambiguous. If the first candidate horizontal azimuth $\theta_1$ obtained through measurement based on the virtual linear array is unambiguous, $\theta_1$ may be substituted into a response matrix of the virtual planar array, to directly obtain two-dimensional angle information $(\theta,\phi)$ of the target. If the first candidate horizontal azimuth $\theta_1$ obtained through measurement based on the linear array is ambiguous, both the first candidate horizontal azimuth $\theta_1$ and the second candidate horizontal azimuth $\theta_2$ need to be used to determine a real horizontal azimuth $\theta$ of the target by using a Chinese remainder theorem. Then, $\theta$ is substituted into a response matrix of the virtual planar array, to obtain two-dimensional angle information $(\theta,\phi)$ of the target.

In a possible design, the horizontal azimuth of the target includes a first horizontal azimuth and a second horizontal azimuth, the vertical azimuth of the target includes a first vertical azimuth and a second vertical azimuth, and the processing unit is further configured to determine that a radar cross-section (RCS) corresponding to the first horizontal azimuth is greater than an RCS corresponding to the second horizontal azimuth, determine that an RCS corresponding to the first vertical azimuth is greater than an RCS corresponding to the second vertical azimuth, and determine that the first horizontal azimuth and the first vertical azimuth are a location of a first sub-target in the target, and the second horizontal azimuth and the second vertical azimuth are a location of a second sub-target in the target. According to the foregoing solution, when there are a plurality of targets around the radar system, matching is performed on a horizontal azimuth and a vertical azimuth of each target. If two horizontal azimuths and two vertical azimuths are obtained through calculation (in other words, there are two targets), a horizontal azimuth and a vertical azimuth that correspond to a larger RCS are a group, and represent two-dimensional angle information of one of the targets, and a horizontal azimuth and a vertical azimuth that correspond to a smaller RCS are a group, and represent two-dimensional angle information of the other target.

In the radar system provided in the first aspect, the transmit antenna array may include a vertical transmit antenna array and a horizontal transmit antenna array. The horizontal transmit antenna array and the receive antenna array form the virtual linear array, and the vertical transmit antenna array and the receive antenna array form the virtual planar array. According to the foregoing solution, an implementation of antenna arrays that form the virtual linear array and the virtual planar array is provided.

In an actual application, when a location of the transmit antenna array and a location of the receive antenna array are determined, a location of the virtual antenna array may be uniquely determined. It is assumed that Pm is coordinates of an antenna m (m=0, 1, ..., Ntx−1) in Ntx transmit antennas, and Qn is a coordinate location of an antenna n (n=0, 1, ..., Nrx−1) in Nrx receive antennas. In this case, a location of an array element in the formed virtual antenna array may be uniquely determined based on Pm+Qn. After the Ntx transmit antennas are traversed for m and the Nrx receive antennas are traversed for n, the location of the virtual antenna array may be determined.

In a specific application, in the radar system provided in the first aspect, transmit antennas in the horizontal transmit antenna array and receive antennas in the receive antenna array are traversed, to uniquely determine a location of the virtual linear array, and transmit antennas in the vertical transmit antenna array and the receive antennas in the receive antenna array are traversed, to uniquely determine a location of the virtual planar array. Therefore, a limitation on the location of the virtual linear array and the location of the virtual planar array may also be considered as a limitation on the real location of the transmit antenna array and the real location of the receive antenna array.

In an actual implementation, because of different pins and granularities of a chip, the transmit antenna array and the receive antenna array may have different implementations. Two implementations are listed below.

Implementation A:

The receive antenna array includes k receive array elements that are arranged in a single line in the horizontal direction, the vertical transmit antenna array includes a first transmit antenna array and a second transmit antenna array that are respectively located on two sides of the receive antenna array, and the first transmit antenna array and the second transmit antenna array each include m transmit array elements that are arranged in a single line in the vertical direction, and the horizontal transmit antenna array includes a third transmit antenna array and a fourth transmit antenna array that are respectively adjacent to the first transmit antenna array and the second transmit antenna array, and the third transmit antenna array and the fourth transmit antenna array each include n transmit array elements that are arranged in a single line in the horizontal direction. In the first implementation, the virtual linear array includes 2*n*k virtual channels arranged in a single line in the horizontal direction, and the virtual planar array includes 2*m*k virtual channels. There are 2*k virtual channels in the horizontal direction, and there are m virtual channels in the vertical direction.

Implementation B:

The receive antenna array includes k receive array elements that are arranged in a single line in the horizontal direction, the vertical transmit antenna array is located on one side of the receive array, and the vertical transmit antenna array includes m transmit array elements that are arranged in a single line in the vertical direction, and the horizontal transmit antenna array is adjacent to the vertical transmit antenna array, and the horizontal transmit antenna array includes n transmit array elements that are arranged in a single line in the horizontal direction. In the second implementation, the virtual linear array includes n*k virtual channels arranged in a single line in the horizontal direction, and the virtual planar array includes m*k virtual channels. There are k virtual channels in the horizontal direction, and there are m virtual channels in the vertical direction.

According to a second aspect, an embodiment of this application provides a vehicle. The vehicle includes the radar system provided in the first aspect and any possible design of the first aspect and an electronic control unit (ECU). The radar system is configured to transmit a radar signal, receive an echo signal obtained after the radar signal is reflected by a target, and determine a horizontal azimuth and a vertical azimuth of the target based on the echo signal, and the ECU is configured to determine a driving route of the vehicle based on the horizontal azimuth and the vertical azimuth of the target.

The vehicle provided in the second aspect may measure a location of the target by using the radar system, to plan a driving route, and further implement automatic driving.

DESCRIPTION OF EMBODIMENTS

Usually, a radar system may increase a virtual aperture by using a MIMO virtual array, to improve angular resolution.

Figure 3:
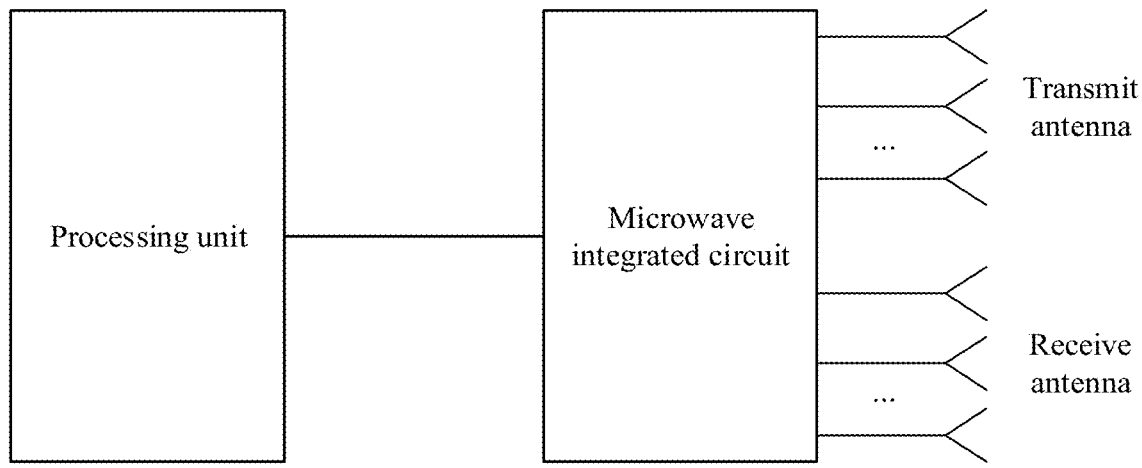
FIG. 3 is a schematic diagram of a structure of a MIMO radar according to an embodiment of this application.

Further, in the embodiments of this application, a MIMO radar system may include an antenna array, a microwave integrated circuit (monolithic microwave integrated circuit (MMIC)), and a processing unit. The antenna array may include a plurality of transmit antennas and a plurality of receive antennas, as shown in FIG. 3.

The microwave integrated circuit is configured to generate a radar signal, and then send the radar signal by using the antenna array. After the radar signal is sent, the radar signal is reflected by a target to form an echo signal, and the echo signal is received by the receive antenna. The microwave integrated circuit is further configured to perform processing such as conversion and sampling on the echo signal received by the antenna array, and transmit the processed echo signal to the processing unit.

The processing unit is configured to perform an operation such as fast Fourier transformation (FFT) or signal processing on the echo signal, to determine information such as a range, a velocity, or an azimuth of the target based on the received echo signal. Further, the processing unit may be a device with a processing function, for example, a microprocessor (microcontroller unit (MCU)), a central processing unit (CPU), a digital signal processor (DSP), or a field-programmable gate array (FPGA).

The antenna array includes a plurality of transmit antennas and a plurality of receive antennas. The transmit antenna is configured to transmit a radar signal, and the receive antenna is configured to receive an echo signal formed after the radar signal is reflected by a target. The antenna array includes a plurality of transmit antennas and a plurality of receive antennas, in other words, includes a plurality of transmit channels and a plurality of receive channels. Therefore, the antenna array may be used to virtualize a virtual array including a plurality of virtual transmit and receive channels, and the processing unit converts the received echo signal into an observation result obtained based on the virtual array, so that processing and calculation may be performed based on the observation result obtained based on the virtual array, to obtain the information such as the range, the velocity, or the azimuth of the target.

It should be noted that the radar system in the embodiments of this application may be applied to a plurality of fields. For example, the radar system in the embodiments of this application includes but is not limited to a vehicle-mounted radar, a roadside traffic radar, an unmanned aerial vehicle radar.

Figure 1:
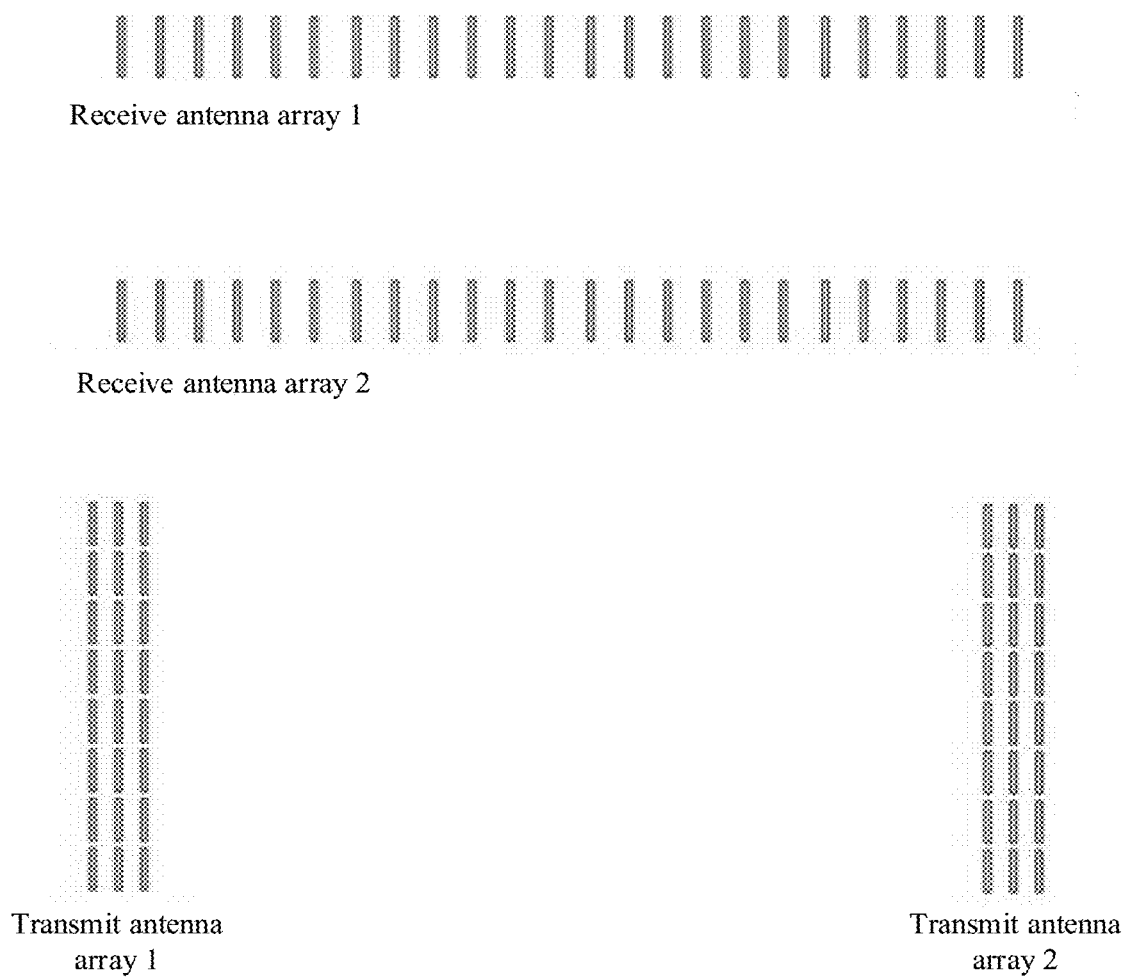
FIG. 1 is a schematic diagram of a radar antenna array scheme.
Figure 2:
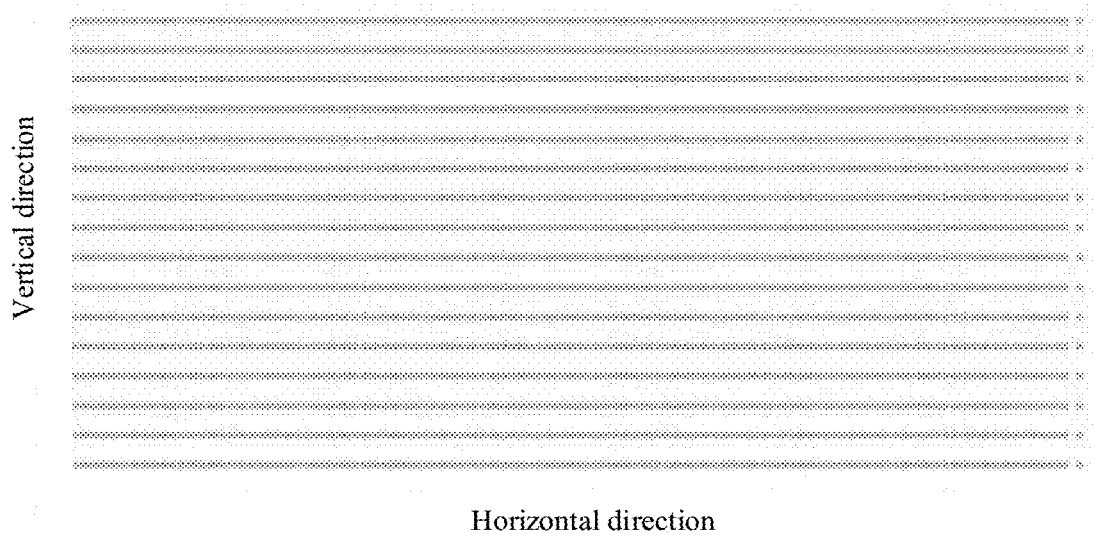
FIG. 2 is a schematic diagram of a virtual antenna array.

In the conventional technology, a radar antenna array scheme shown in FIG. 1 is usually used to form a virtual antenna array shown in FIG. 2. The virtual antenna array shown in FIG. 2 is a 144*16 uniform two-dimensional array, there are 24*6=144 virtual channels in a horizontal direction, and 8*2=16 virtual channels in a vertical direction.

The virtual antenna array shown in FIG. 2 is a uniform planar array, and it is simple to match an angle in the horizontal direction and an angle in the vertical direction of the virtual antenna array. Therefore, to achieve high resolution in the horizontal direction and the vertical direction, a large quantity of transmit array elements and a large quantity of receive array elements need to be disposed, to increase a quantity of virtual channels in the horizontal direction and the vertical direction, and increase calculation precision of a horizontal azimuth and a vertical azimuth.

However, when there is a large quantity of transmit antennas and a large quantity of receive antennas, design and processing difficulty of the antenna array is increased (for example, because there is a small spacing between the transmit antennas, the antenna needs to be fed through a via, and there is a high design and processing requirement). In addition, the antenna array further occupies large space on a chip. Therefore, according to the antenna array scheme shown in FIG. 1, angular resolution may be increased to an extent, but there is large design and processing difficulty and high costs.

The embodiments of this application provide a radar system and a vehicle, so that when high angular resolution is obtained, a quantity of transmit array elements and a quantity of receive array elements are reduced, to reduce design and processing difficulty.

In addition, the transmit array element is connected to a transmit channel in the chip, the receive array element is connected to a receive channel in the chip, the quantity of transmit array elements or the quantity of receive array elements is reduced, in other words, a quantity of transmit channels and a quantity of receive channels in the chip are correspondingly reduced, and an amount of storage and processing corresponding to the quantity of transmit and receive channels is reduced. Therefore, according to the solutions provided in this application, a chip area, chip costs, and chip power consumption may be further reduced, thereby reducing a size, costs, and power consumption of a radar module.

It should be noted that in the embodiments of this application, "a plurality of" means two or more. In addition, it should be understood that in descriptions of this application, terms such as "first" and "second" are merely used for differentiation and description, but should not be understood as an indication or implication of relative importance or an indication or implication of an order. "Coupling" in this application refers to an electrical connection, and may include two manners: a direct connection or an indirect connection. An application scenario of the embodiments of this application is briefly described below.

The following further describes in detail embodiments of this application with reference to the accompanying drawings.

Figure 4:
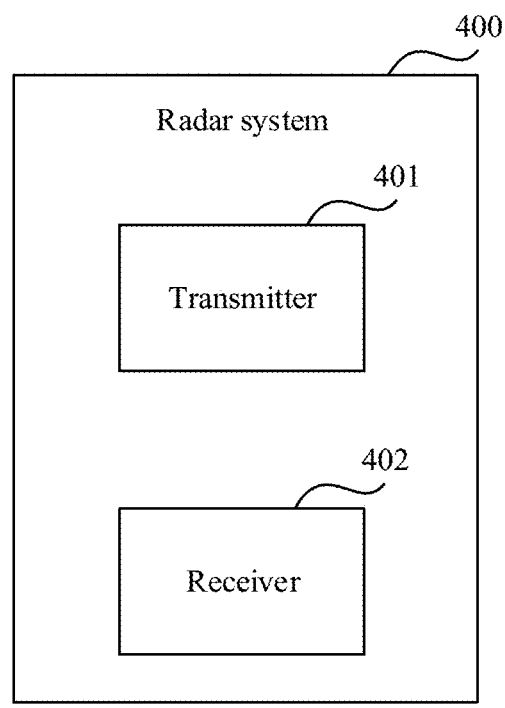
FIG. 4 is a schematic diagram of a structure of a radar system according to an embodiment of this application.

Refer to FIG. 4. A radar system 400 provided in an embodiment of this application includes a transmitter 401 and a receiver 402.

The transmitter 401 is configured to transmit a radar signal.

The receiver 402 is configured to receive an echo signal obtained after the radar signal is reflected by a target.

The echo signal may be used to determine a horizontal azimuth and a vertical azimuth of the target. The radar signal may be any one of an FMCW, an MFSK, and a PMCW. Certainly, the radar signal may alternatively have a waveform used for another vehicle millimeter wave radar. This is not limited in this application.

A transmit antenna array of the transmitter 401 and a receive antenna array of the receiver 402 are used to form a virtual linear array (or a one-dimensional linear array) and a virtual planar array (or a two-dimensional planar array). The virtual linear array includes a uniform linear array in a first direction, and the virtual planar array includes a uniform planar array. A first spacing $d_1$ between two adjacent array elements (namely, virtual channels) in the uniform linear array is less than a second spacing $d_2$ between two adjacent array elements (namely, virtual channels) in the uniform planar array in the first direction.

Further, the first direction may be a horizontal direction, or may be a vertical direction. If the first direction is the horizontal direction, the virtual linear array is used to determine a horizontal azimuth measurement value of the target, and the virtual planar array is used to determine a vertical azimuth measurement value and the horizontal azimuth measurement value of the target, or if the first direction is the vertical direction, the virtual linear array is used to determine a vertical azimuth measurement value of the target, and the virtual planar array is used to determine the vertical azimuth measurement value and a horizontal azimuth measurement value of the target. In accompanying drawings and examples of this application, an example in which the first direction is the horizontal direction is used for illustration.

It should be noted that the horizontal direction and the vertical direction in this embodiment of this application are related to locations of virtual antenna arrays (the virtual linear array and the virtual planar array) including the transmit antenna array and the receive antenna array. That the first direction is the horizontal direction is used as an example. The horizontal direction may be understood as a direction in which array elements in the virtual linear array are sequentially arranged, and the vertical direction may be understood as a direction that is in a plane in which the virtual antenna array is located and that is perpendicular to the horizontal direction. For example, in this embodiment of this application, the horizontal direction and the vertical direction are relative to the ground on which a vehicle equipped with the radar system 400 runs.

In addition, in this embodiment of this application, the uniform linear array and the uniform planar array may be understood as follows. The uniform linear array includes a plurality of array elements arranged in a single line in the first direction, and there is an equal spacing between every two adjacent array elements. It may be considered that the uniform planar array is formed by arranging a plurality of uniform linear arrays in a second direction perpendicular to the first direction, and each uniform linear array includes a plurality of array elements arranged in a single line in the first direction. In the uniform planar array, there is an equal spacing between two adjacent array elements in the first direction, and an equal spacing between two adjacent array elements in the second direction. For example, the uniform planar array includes p*q array elements. To be specific, the uniform planar array is formed by arranging q uniform linear arrays at an equal interval in the second direction, and each uniform linear array includes p array elements arranged in a single line in the first direction. In each uniform linear array, there is an equal spacing between two adjacent array elements.

Figure 5:
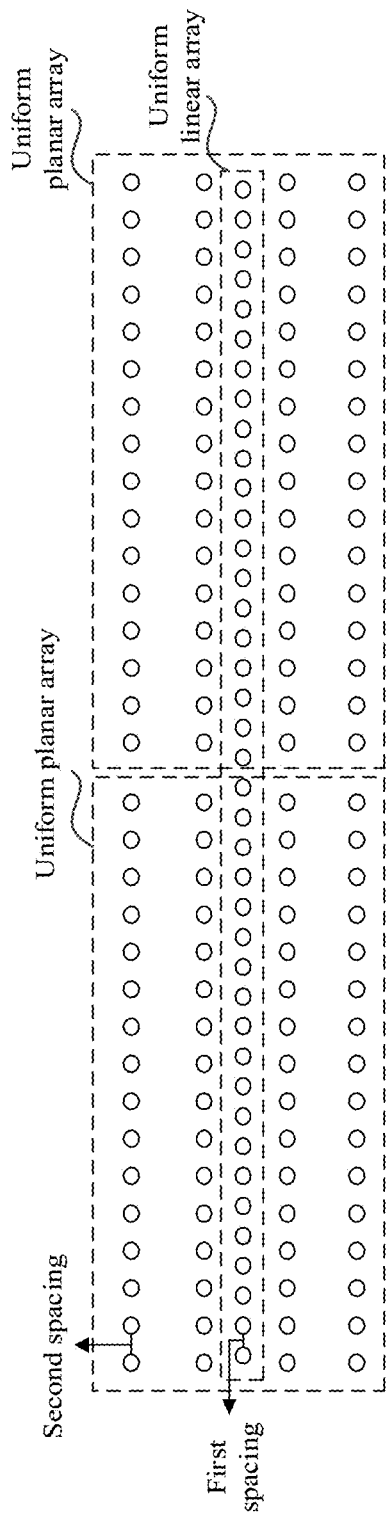
FIG. 5 is a schematic diagram of a first virtual antenna array according to an embodiment of this application.

For example, a possible distribution form of the virtual linear array and the virtual planar array may be shown in FIG. 5. That the first direction is the horizontal direction is used as an example. It can be learned from FIG. 5 that the virtual linear array includes a uniform linear array arranged in a single line in the horizontal direction, and the uniform linear array includes 40 array elements, and the virtual planar array includes two uniform arrays, and each uniform planar array includes 16*4 array elements. In the horizontal direction, a first spacing between two array elements in the uniform linear array is greater than a second spacing between two array elements in the uniform planar array.

Different from the conventional technology, in this embodiment of this application, the transmit antenna array of the transmitter 401 and the receive antenna array of the receiver 402 may be used to virtualize one virtual linear array and one virtual planar array. The virtual linear array includes the uniform linear array in the first direction, and the virtual planar array includes the uniform planar array. There may be one or more uniform linear arrays included in the virtual linear array, and there may also be one or more uniform planar arrays included in the virtual planar array.

That the virtual linear array includes the uniform linear array in the first direction may mean that the virtual linear array includes one or more uniform linear arrays in the first direction. If the virtual linear array includes a plurality of uniform linear arrays in the first direction, in this application, there is only a limitation that the uniform linear array may be found in the virtual linear array in an interpolation manner, and the virtual linear array is not limited to a uniform linear array.

Similarly, that the virtual planar array includes the uniform planar array may mean that the virtual planar array includes one or more uniform planar arrays. If the virtual planar array includes a plurality of uniform planar arrays, in this application, there is only a limitation that the uniform planar array may be found in the virtual planar array in an interpolation manner, and the virtual planar array is not limited to a uniform planar array.

In particular, the uniform linear array is arranged more densely than the uniform planar array. In this manner, because a dense uniform linear array may be used to ensure a large FOV in the first direction, there may be a more accurate calculation result when an azimuth (for example, the horizontal azimuth) corresponding to the first direction is calculated by using the uniform linear array (in other words, an azimuth of the target is calculated based on an observation result obtained based on each array element in the virtual antenna array). In addition, the uniform linear array may meet an FOV requirement in the first direction, a large spacing may be set between array elements in the uniform planar array in the first direction (if there is a small FOV, aliasing may exist in directions of a plurality of angles within an FOV range of the uniform linear array), to obtain correct angle information in the first direction by using an FOV of the uniform linear array. In other words, an antenna array disposed corresponding to the uniform planar array may include only a small quantity of array elements, to reduce a quantity of transmit array elements and a quantity of receive array elements. When the uniform linear array and the uniform planar array have a same aperture in the first direction, obtained angular resolution of the uniform linear array and the uniform planar array in the first direction is the same. When an aperture of the uniform linear array in the first direction is greater than an aperture of the uniform planar array in the first direction, obtained angular resolution of the uniform linear array in the first direction is higher, and angular information of the obtained higher angular resolution of the uniform linear array in the first direction may be substituted into the uniform planar array, to obtain angle information in a second direction through calculation (for example, may be the vertical direction). Therefore, in comparison with the conventional technology, in the solution in this application, the same angular resolution may be obtained in the first direction, but a smaller quantity of array elements is required.

In a possible example, if the first spacing is $d_1$, and the second spacing is $d_2$, $d_1$ and $d_2$ meet the following relationship: $M*d_1=N*d_2$, where M and N each are a positive integer, and M>N.

That the first direction is the horizontal direction is used as an example. The horizontal azimuth measurement value of the target may be determined by using the virtual linear array virtualized by using the transmitter 401 and the receiver 402, and the horizontal azimuth measurement value and the vertical azimuth measurement value of the target may be determined by using the virtual planar array virtualized by using the transmitter 401 and the receiver 402. In an actual application, when a spacing between array elements in the horizontal direction in the uniform linear array or the uniform planar array falls within a specific range, when the horizontal azimuth is determined by using the virtual linear array, angle ambiguity may exist (in other words, there are a plurality of measurement values of one target within an FOV range of the radar system). Therefore, after horizontal azimuth measurement values of the target are respectively obtained by using the virtual linear array and the virtual planar array, a real horizontal azimuth of the target may be determined by using a Chinese remainder theorem.

The following describes ambiguity: Usually, an unambiguous FOV is defined as FOV=2*arcsin ($\lambda$/2d), where d is an interval between array elements. It can be easily learned that a larger value of d indicates a smaller value of the unambiguous FOV. It is assumed that the FOV of the uniform linear array is an FOV 1, and an FOV of the uniform planar array in the first direction is an FOV 2. Because $d_1<d_2$, FOV 2<FOV 1. When an angle $\theta_1$ corresponding to the target within the FOV 1 is measured in the first direction in the uniform planar array, only an angle $\theta_2$ within the FOV 2 can be obtained. A real angle of the target in the first direction is $\theta=k1*FOV1+\theta_1=k2*FOV2+\theta_2$, where k1 and k2 respectively correspond to aliasing coefficients of the FOV 1 and the FOV 2 in FOVs designed in the system. When there is aliasing in the FOV 1, $\theta$ may correspondingly have different values when k1 has different values, and the different values of $\theta$ may be considered as a plurality of measurement values of one target. When there is no aliasing in the FOV 1, k1 is 0. Similarly, when $\theta_2$ obtained through calculation based on the uniform planar array is ambiguous, $\theta$ may correspondingly have different values when k2 has different values, and the different values of $\theta$ may be considered as a plurality of measurement values of one target.

Further, the first spacing may be less than or equal to a half of a carrier wavelength of the radar signal. If the first spacing is less than or equal to a half of the carrier wavelength of the radar signal, the angle ambiguity does not exist when the horizontal azimuth measurement value of the target is determined by using the virtual linear array. Therefore, there is a simpler calculation manner of determining the horizontal azimuth of the target. Certainly, the first spacing may alternatively be greater than a half of the carrier wavelength of the radar signal. When the horizontal azimuth measurement value of the target is determined by using the virtual linear array, angle ambiguity exists. Therefore, the real horizontal azimuth of the target needs to be further determined by using the Chinese remainder theorem.

According to the solution in this embodiment of this application, the transmit antenna array of the transmitter 401 and the receive antenna array of the receiver 402 may be used to virtualize one virtual linear array and one virtual planar array. Only array elements in the virtual linear array are dense, and array elements in the virtual planar array are sparse. Therefore, the virtual linear array and the virtual planar array may be realized by using a small quantity of transmit antennas and a small quantity of receive antennas. Because the array elements in the virtual linear array and the array elements in the virtual planar array in the first direction have different density (the first spacing is less than the second spacing), different FOVs may be obtained when azimuths corresponding to the first direction are respectively calculated by using the virtual linear array and the virtual planar array. The FOV of the virtual linear array in the first direction is greater than the FOV of the virtual planar array in the first direction, and a result of obtaining the azimuth in the first direction through calculation by using the virtual linear array is more accurate. Therefore, when the azimuths of the target are determined based on observation results obtained based on the two arrays of the virtual linear array and the virtual planar array, matching may be performed between the different FOVs.

It can be easily learned that a matching degree between the virtual antenna arrays including the virtual linear array and the virtual planar array is more complex than a matching degree between virtual antenna arrays shown in FIG. 2. Therefore, in this embodiment of this application, high angular resolution may be obtained through calculation based on the two virtual arrays, without a need to set too much transmit antennas in the transmitter 401 and too much receive antennas in the receiver 402 includes calculating the azimuth corresponding to the first direction by using a virtual linear array whose array elements are densely distributed in the first direction, and substituting, into a response matrix of the virtual planar array, angle information that is in the first direction and that is obtained through calculation, to calculate angle information corresponding to the second direction (for example, may be the vertical direction) perpendicular to the first direction, so as to obtain high resolution in azimuths in the first direction and the second direction through calculation. In other words, according to the solution in this embodiment of this application, the vertical azimuth and the horizontal azimuth of the target may be calculated by using a small quantity of transmit antennas and a small quantity of receive antennas, to reduce design and processing difficulty of the antenna array, and reduce costs of the radar system.

In this embodiment of this application, the transmit antenna array of the transmitter 401 and the receive antenna array of the receiver 402 form one virtual linear array and one virtual planar array. Further, the transmit antenna array may include a vertical transmit antenna array and a horizontal transmit antenna array. The horizontal transmit antenna array and the receive antenna array form the virtual linear array, and the vertical transmit antenna array and the receive antenna array form the virtual planar array.

Further, in an actual application, when a location of the transmit antenna array and a location of the receive antenna array are determined, a location of the virtual antenna array may be uniquely determined. It is assumed that Pm is coordinates of an antenna m (m=0, 1, . . . , Ntx−1) in Ntx transmit antennas, and Qn is a coordinate location of an antenna n (n=0, 1, . . . , Nrx−1) in Nrx receive antennas. In this case, a location of an array element in the formed virtual antenna array may be uniquely determined based on Pm+Qn. After the Ntx transmit antennas are traversed for m and the Nrx receive antennas are traversed for n, the location of the virtual antenna array may be determined.

In a specific application, in this embodiment of this application, transmit antennas in the horizontal transmit antenna array and receive antennas in the receive antenna array are traversed, to uniquely determine a location of the virtual linear array, and transmit antennas in the vertical transmit antenna array and the receive antennas in the receive antenna array are traversed, to uniquely determine a location of the virtual planar array. Therefore, a limitation on the location of the virtual linear array and the location of the virtual planar array in this embodiment of this application may also be considered as a limitation on the real location of the transmit antenna array and the real location of the receive antenna array.

It should be noted that the transmitter 401 may be an apparatus including the transmit antenna array and a transmit channel, and the receiver 402 may be an apparatus including the receive antenna array and a receive channel. The transmit antenna array and the receive antenna array may be located on a printed circuit board (PCB), and the transmit channel and the receive channel may be located in a chip, namely, an antenna on PCB (AOB). Alternatively, the transmit antenna array and the receive antenna array may be located in a chip package, and the transmit channel and the receive channel may be located in a chip, namely, an antenna in package (AIP). A combination form is not limited in this embodiment of this application.

It should be understood that the transmitter 401 and the receiver 402 in this embodiment of this application are mainly improved in an arrangement manner of the transmit antenna array and the receive antenna array. Therefore, the transmit channel and the receive channel are not described in detail in the following description.

In an actual implementation, because of different pins and granularities of the chip, the transmit antenna array and the receive antenna array may have different implementations. Two implementations are listed below. Other manners are not enumerated.

A:

In a first implementation, the receive antenna array includes k receive array elements that are arranged in a single line in the horizontal direction, the vertical transmit antenna array includes a first transmit antenna array and a second transmit antenna array that are respectively located on two sides of the receive antenna array, and the first transmit antenna array and the second transmit antenna array each include m transmit array elements that are arranged in a single line in the vertical direction, and the horizontal transmit antenna array includes a third transmit antenna array and a fourth transmit antenna array that are respectively adjacent to the first transmit antenna array and the second transmit antenna array, and the third transmit antenna array and the fourth transmit antenna array each include n transmit array elements that are arranged in a single line in the horizontal direction.

It can be easily learned that in the first implementation, the third transmit antenna array, the fourth transmit antenna array, and the receive antenna array form the virtual linear array. Because the third transmit antenna array and the fourth transmit antenna array each include n transmit array elements that are arranged in a single line in the horizontal direction, and the receive antenna array includes k receive array elements that are arranged in a single line in the horizontal direction, the virtual linear array includes 2*n*k virtual channels arranged in a single line in the horizontal direction.

The first transmit antenna array, the second transmit antenna array, and the receive antenna array form the virtual planar array. Because the first transmit antenna array and the second transmit antenna array each include m transmit array elements that are arranged in a single line in the vertical direction, and the receive antenna array includes k receive array elements that are arranged in a single line in the horizontal direction, the virtual planar array includes 2*m*k virtual channels, there are 2*k virtual channels in the horizontal direction, and there are m virtual channels in the vertical direction.

Figure 6:
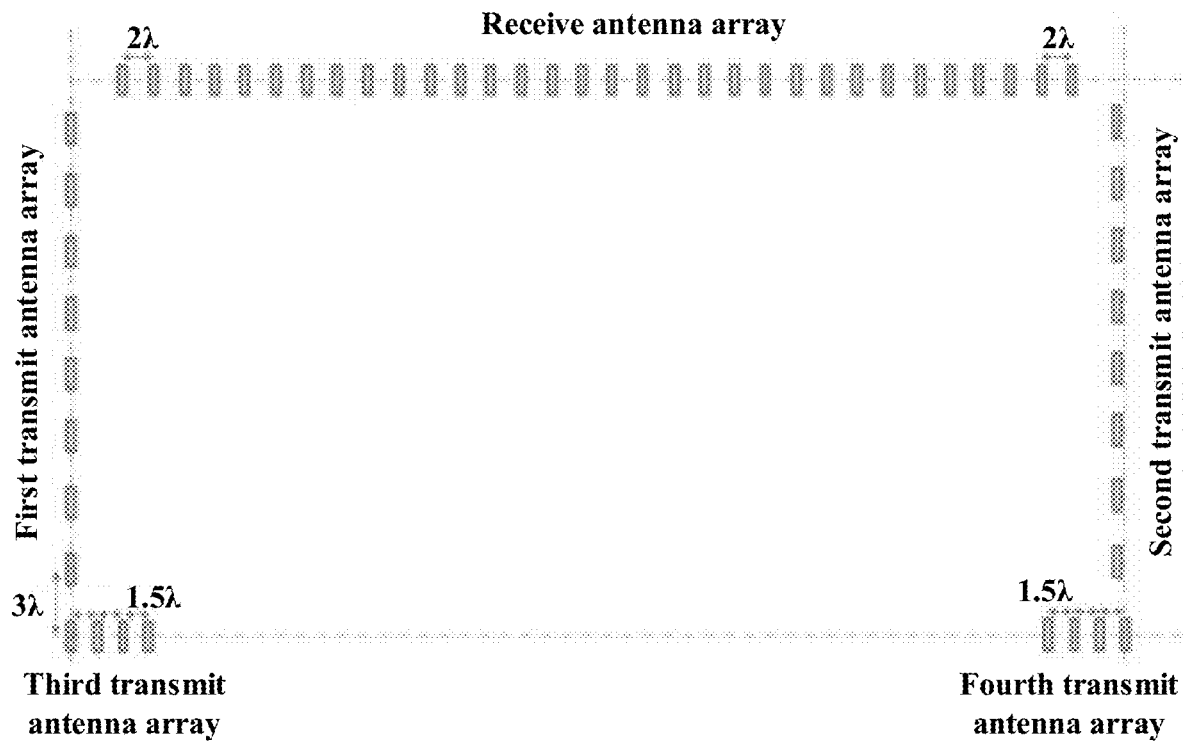
FIG. 6 is a schematic diagram of an antenna array in a radar system according to an embodiment of this application.

For example, a distribution manner of the transmit antenna array and the receive antenna array may be shown in FIG. 6. In the example in FIG. 6, an example in which k=32, m=8, and n=4 is used for illustration. In an actual application, values of k, m, and n are not limited to a case illustrated in FIG. 6. A spacing between transmit array elements in the first transmit antenna array and the second transmit antenna array is 3λ (λ is the carrier wavelength of the radar signal), a spacing between transmit array elements in the third transmit antenna array and the fourth transmit antenna array is 1.5λ, and a spacing between receive array elements in the receive antenna array is 2λ.

It should be noted that, because the transmit array elements in the first transmit antenna array and the second transmit antenna array and the receive array elements in the receive antenna array need to form a virtual channel, the first transmit antenna array and the second transmit antenna array are usually distributed on an outside of the receive antenna array, so that each transmit array element and any receive array element may form a virtual channel, to avoid blocking.

Figure 7:
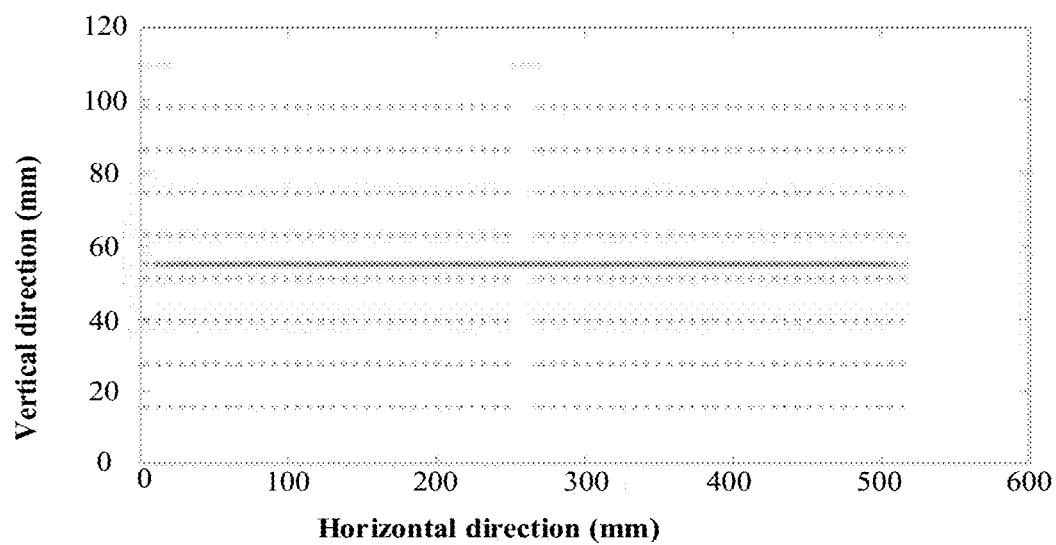
FIG. 7 is a schematic diagram of a second virtual antenna array according to an embodiment of this application.

The virtual linear array and the virtual planar array including the transmit antenna array and the receive antenna array shown in FIG. 6 may be shown in FIG. 7. In FIG. 7, the virtual linear array includes 2*4*32=256 virtual channels. In the virtual planar array, there are 2*32=64 virtual channels in the horizontal direction, and there are eight virtual channels in the vertical direction.

It can be easily learned that in the example in FIG. 7, an aperture size of the virtual linear array is the same as an aperture size of the virtual planar array in the horizontal direction. The virtual linear array includes one uniform linear array, and the virtual planar array includes two uniform planar arrays. The uniform linear array is arranged more densely than the uniform planar array.

B:

In a second implementation, the receive antenna array includes k receive array elements that are arranged in a single line in the horizontal direction, the vertical transmit antenna array is located on one side of the receive array, and the vertical transmit antenna array includes m transmit array elements that are arranged in a single line in the vertical direction, and the horizontal transmit antenna array is adjacent to the vertical transmit antenna array, and the horizontal transmit antenna array includes n transmit array elements that are arranged in a single line in the horizontal direction.

It can be easily learned that in the second implementation, the horizontal transmit antenna array and the receive antenna array form a virtual linear array. Because the horizontal transmit antenna array includes n transmit array elements that are arranged in a single line in the horizontal direction, and the receive antenna array includes k receive array elements that are arranged in a single line in the horizontal direction, the virtual linear array includes n*k virtual channels arranged in a single line in the horizontal direction.

The vertical transmit antenna array and the receive antenna array form the virtual planar array. Because the vertical transmit antenna array includes m transmit array elements that are arranged in a single line in the vertical direction, and the receive antenna array includes k receive array elements that are arranged in a single line in the horizontal direction, the virtual planar array includes m*k virtual channels, there are k virtual channels in the horizontal direction, and there are m virtual channels in the vertical direction.

Figure 8:
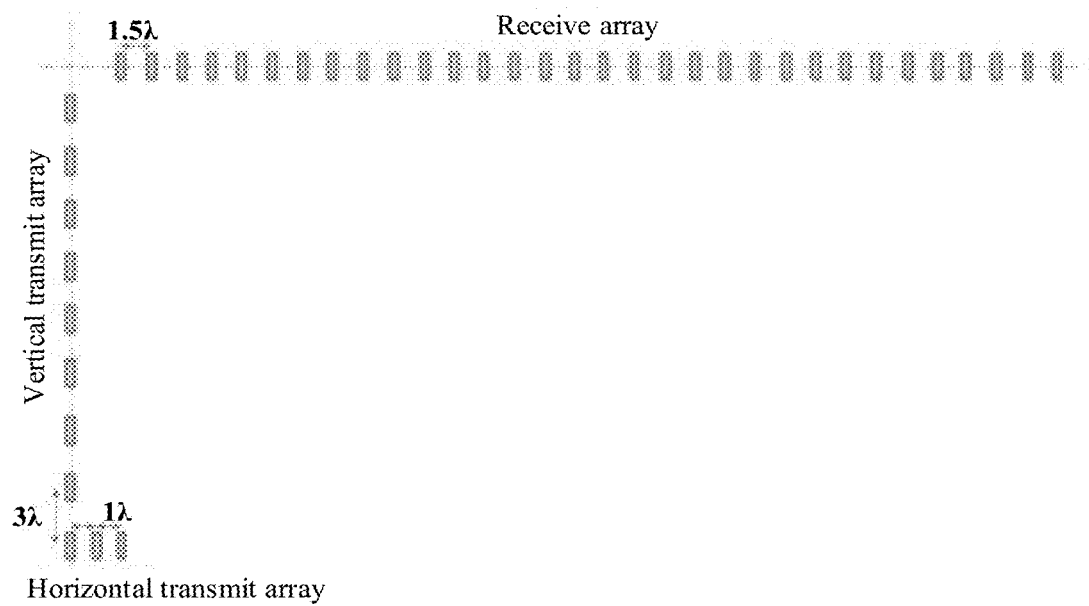
FIG. 8 is a schematic diagram of an antenna array in another radar system according to an embodiment of this application.

For example, a distribution manner of the transmit antenna array and the receive antenna array may be shown in FIG. 8. In the example in FIG. 8, an example in which k=32, m=8, and n=3 is used for illustration. In an actual application, values of k, m, and n are not limited to a case illustrated in FIG. 8. A spacing between transmit array elements in the horizontal transmit antenna array is $1\lambda$ ($\lambda$ is the carrier wavelength of the radar signal), a spacing between transmit array elements in the vertical transmit antenna array is $3\lambda$, and a spacing between receive array elements in the receive antenna array is $1.5\lambda$.

It should be noted that, because the transmit array element in the vertical transmit antenna array and the receive array element in the receive antenna array need to form a virtual channel, the vertical transmit antenna array is usually distributed on an outside of the receive antenna array, so that each transmit array element and any receive array element may form a virtual channel, to avoid blocking.

Figure 9:
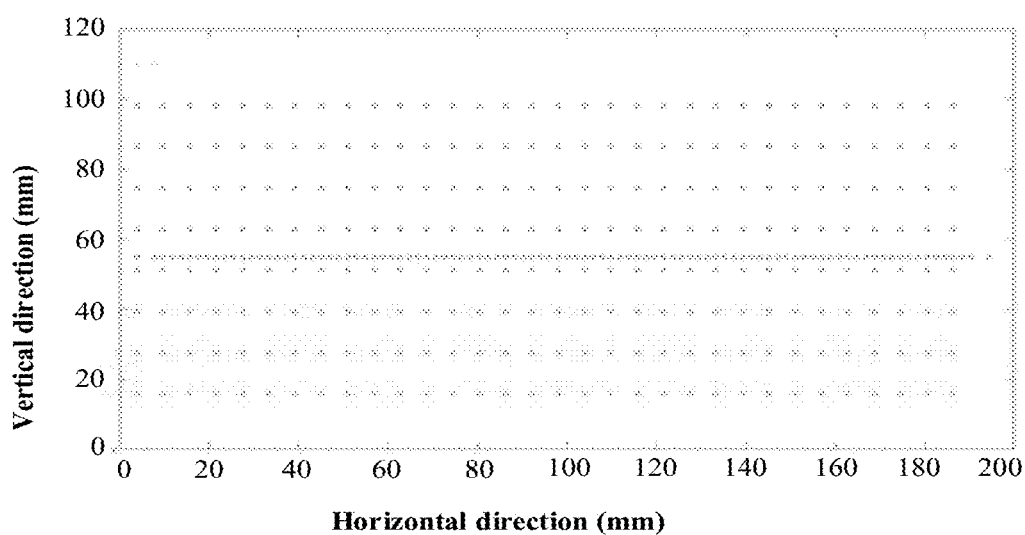
FIG. 9 is a schematic diagram of a third virtual antenna array according to an embodiment of this application.

The virtual linear array and the virtual planar array including the transmit antenna array and the receive antenna array shown in FIG. 8 may be shown in FIG. 9. In FIG. 9, the virtual linear array includes 3*32=96 virtual channels. In the virtual planar array, there are 32 virtual channels in the horizontal direction, and there are eight virtual channels in the vertical direction.

It can be easily learned that in FIG. 9, an aperture size of the virtual linear array is the same as an aperture size of the virtual planar array in the horizontal direction. The virtual linear array includes one uniform linear array, and the virtual planar array includes one uniform planar array. The uniform linear array is arranged more densely than the uniform planar array.

It should be noted that, in this embodiment of this application, the foregoing two implementations are merely examples, and an arrangement manner of the transmit antenna array and the receive antenna array is not limited to the manner shown in FIG. 6 or FIG. 8.

For example, in the example in FIG. 6, the first transmit antenna array and the second transmit antenna array each may include two or three columns of eight transmit array elements arranged in a single line in the vertical direction, or the first transmit antenna array and the second transmit antenna array each may include four columns of eight transmit array elements arranged in a single line in the vertical direction, and a spacing between transmit array elements in the horizontal direction is less than $1.5\lambda$.

For example, in the example in FIG. 8, the receive antenna array may include two rows of 32 receive array elements arranged in a single line in the horizontal direction.

Figure 10:
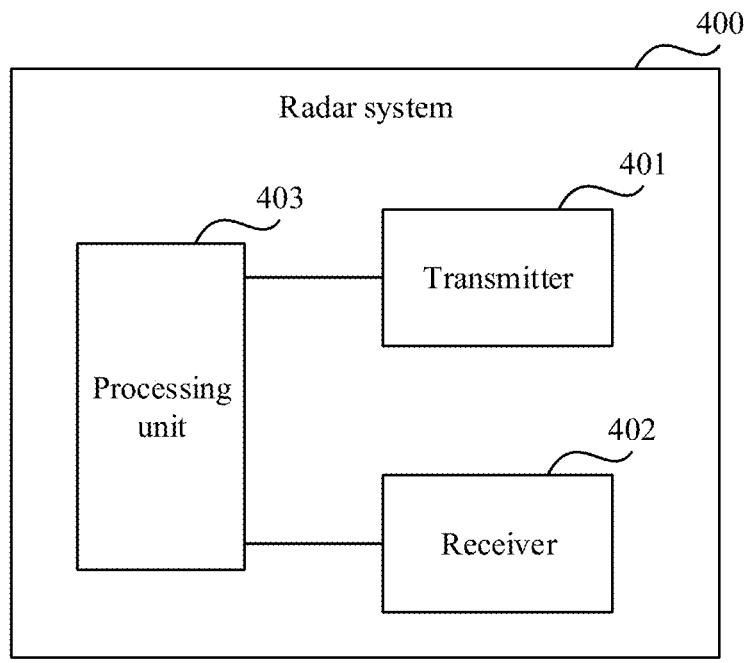
FIG. 10 is a schematic diagram of a structure of another radar system according to an embodiment of this application.

In addition, the radar system 400 may further include a processing unit 403 configured to determine the horizontal azimuth and the vertical azimuth of the target based on the echo signal, as shown in FIG. 10.

The processing unit 403 may be considered as the processing unit in FIG. 3, or may be considered as a set of the processing unit and the microwave integrated circuit in FIG. 3. The processing unit 403 is coupled to the transmitter 401 and the receiver 402.

Further, the processing unit 403 may determine the horizontal azimuth and the vertical azimuth of the target in the following manner: separately determining, based on the echo signal, an observation result that is of the radar signal and that is obtained based on the virtual linear array and an observation result that is of the radar signal and that is obtained based on the virtual planar array, and determining the horizontal azimuth and the vertical azimuth of the target based on the observation result that is of the radar signal and that is obtained based on the virtual linear array and the observation result that is of the radar signal and that is obtained based on the virtual planar array.

After the receive antenna array receives the echo signal, the processing unit 403 may obtain, through calculation based on a signal received by each receive antenna in the receive antenna array, the observation result that is of the radar signal and that is obtained based on the virtual linear array and the observation result that is of the radar signal and that is obtained based on the virtual planar array.

After obtaining the observation result that is of the radar signal and that is obtained based on the virtual linear array and the observation result that is of the radar signal and that is obtained based on the virtual planar array, a processing process of the processing unit 403 may be divided into three steps: Step 1: Determine a first candidate horizontal azimuth of the target based on the observation result that is of the radar signal and that is obtained based on the virtual linear array. Step 2: Determine a second candidate horizontal azimuth and a candidate vertical azimuth of the target based on the observation result that is of the radar signal and that is obtained based on the virtual planar array. Step 3: Determine the horizontal azimuth and the vertical azimuth of the target based on the first candidate horizontal azimuth, the second candidate horizontal azimuth, and the candidate vertical azimuth. The following describes the three steps in detail.

Step 1:

For a target whose horizontal azimuth is $\theta$, a phase response vector of the virtual linear array is $a_n(\theta)$:

$$a_n(\theta) = [1 \; \exp(-j*2\lambda d_1 \sin\theta/\lambda) \; \ldots \; \exp(-j*2\pi(n-1)d_1 \sin\theta/\lambda)].$$

Assuming that the target signal is s(t), an observation result $x_n(t)$ obtained based on the virtual linear array is:

$$x_n(t) = a_n(\theta)s(t) + u(t).$$

Herein, u(t) is noise, $n \in [1, 2, 3, \ldots, N]$ is a sequence number of each virtual channel in the virtual linear array, N is a quantity of virtual channels included in the virtual linear array, $\theta$ is the first candidate horizontal azimuth of the target, $d_1$ is the first spacing between two adjacent virtual channels in the uniform linear array, and $\lambda$ is the carrier wavelength of the radar signal. After determining the observation result that is of the radar signal and that is obtained based on the virtual linear array, the processing unit 403 may obtain a first candidate horizontal azimuth $\theta_1$ of the target by using a common angle estimation algorithm such as DBF or FFT. For specific steps, refer to descriptions in the conventional technology. Details are not described herein.

It should be noted that, as described above, when the horizontal azimuth measurement value of the target is determined by using the virtual linear array, angle ambiguity may exist. In other words, the first candidate horizontal azimuth may include a plurality of azimuths, and only some horizontal azimuths are real horizontal azimuths of the target.

In step 1, if $d_1 = \lambda/2$, angle ambiguity does not exist, and one target has only one measurement value within an FOV range of the system. In other words, the first candidate horizontal azimuth θ1 determined according to the foregoing formula is the real horizontal azimuth of the target. Alternatively, if $d_1 > \lambda/2$, angle ambiguity may exist, and one target may have a plurality of measurement values within an FOV range of the system. In other words, the first candidate horizontal azimuth $\theta_1$ determined according to the foregoing formula may include a plurality of measurement values, and some of the measurement values are real horizontal azimuths of the target. In this case, the real horizontal azimuth of the target further needs to be determined by using the observation result obtained based on the virtual planar array.

Figure 11:
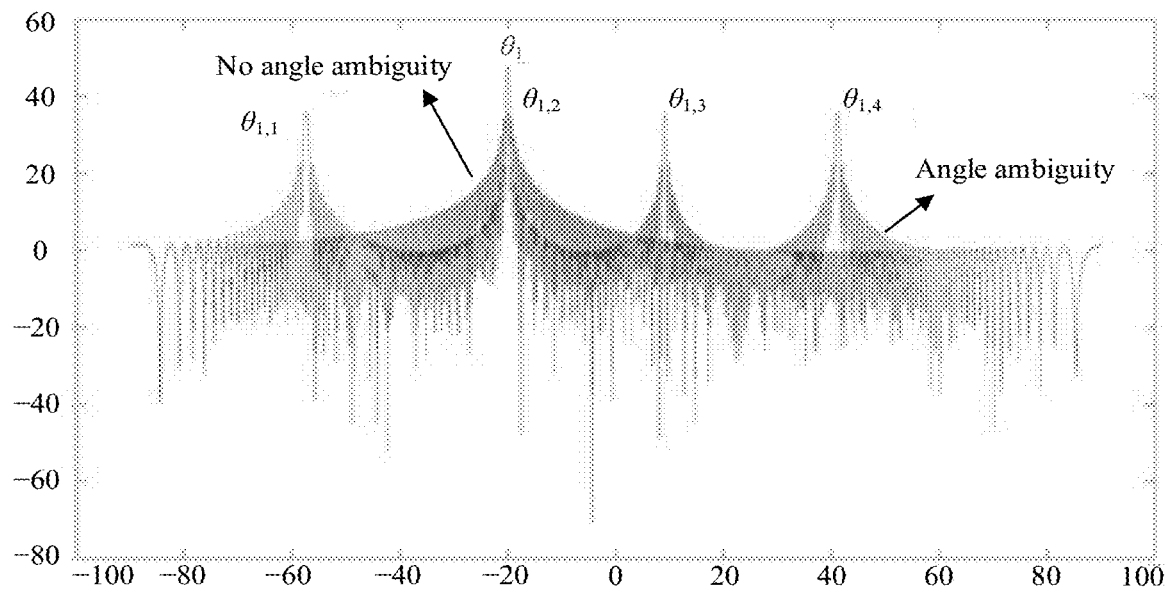
FIG. 11 is a schematic diagram of responses of a first virtual linear array and virtual planar array according to an embodiment of this application.

For example, FIG. 11 shows the first candidate horizontal azimuth obtained based on the virtual linear array. If angle ambiguity does not exist, the determined first candidate horizontal azimuth may be $\theta_1$ in FIG. 11. In this case, $\theta_1$ is the real horizontal azimuth of the target. Alternatively, if angle ambiguity exists, the determined first candidate horizontal azimuth may be $\theta_{1,1}$, $\theta_{1,2}$, $\theta_{1,3}$, and $\theta_{1,4}$, in FIG. 11, and some horizontal azimuths are real horizontal azimuths of the target.

Step 2:

For a target whose vertical azimuth is $\phi$, a phase response vector of the virtual planar array is:

$$a_m(\phi) = [1\ \exp(-j*2\pi d_3 \sin \phi/\lambda) \ldots \exp(-j*2\pi(m-1)d_3 \sin \phi/\lambda)].$$

Herein, m is a quantity of virtual channels in the virtual planar array in the vertical direction, $d_3$ is a spacing between virtual channels in the vertical direction, and $\lambda$ is the carrier wavelength of the radar signal.

If there are k virtual channels in the virtual planar array in the horizontal direction, a phase response matrix of the virtual planar array for the target may be obtained:

$$A = a_k^T(\theta) a_m(\phi).$$

Herein, $a_k(\theta) = [1\ \exp(-j*2\pi d_2 \sin \theta/\lambda) \ldots \exp(-j*2\pi(k-1)d_2 \sin \theta/\lambda)]$. For a target whose horizontal azimuth is $\theta$ and vertical azimuth is $\phi$, a measurement result X(t) of the virtual planar array is:

$$X(t) = As(t) + w(t).$$

After determining the observation result that is of the radar signal and that is obtained based on the virtual planar array, the processing unit 403 may obtain a second candidate horizontal azimuth $\theta_2$ and a candidate vertical azimuth $\phi$ of the target by using a common angle estimation algorithm such as two-dimensional DBF or two-dimensional FFT. For specific steps, refer to descriptions in the conventional technology. Details are not described herein. It should be understood that, because there is a large spacing between virtual channels in the virtual planar array in the horizontal direction, the second candidate horizontal azimuth $\theta_2$ obtained based on only the virtual planar array is ambiguous.

Step 3:

Two-dimensional angle information $(\theta,\phi)$ of the target may be obtained by using the first candidate horizontal azimuth obtained in step 1, and the second candidate horizontal azimuth and the candidate vertical azimuth that are obtained in step 2.

Case 1:

If the first candidate horizontal azimuth $\theta_1$ obtained through measurement based on the virtual linear array is unambiguous, $\theta_1$ may be substituted into the response matrix of the virtual planar array, to directly obtain the two-dimensional angle information $(\theta,\phi)$ of the target.

Case 2:

If the first candidate horizontal azimuth $\theta_1$ obtained through measurement based on a linear array is ambiguous, both the first candidate horizontal azimuth $\theta_1$ and the second candidate horizontal azimuth $\theta_2$ need to be used to determine a real horizontal azimuth $\theta$ of the target by using a Chinese remainder theorem. Then, $\theta$ is substituted into the response matrix of the virtual planar array, to obtain the two-dimensional angle information $(\theta,\phi)$ of the target.

Figure 12:
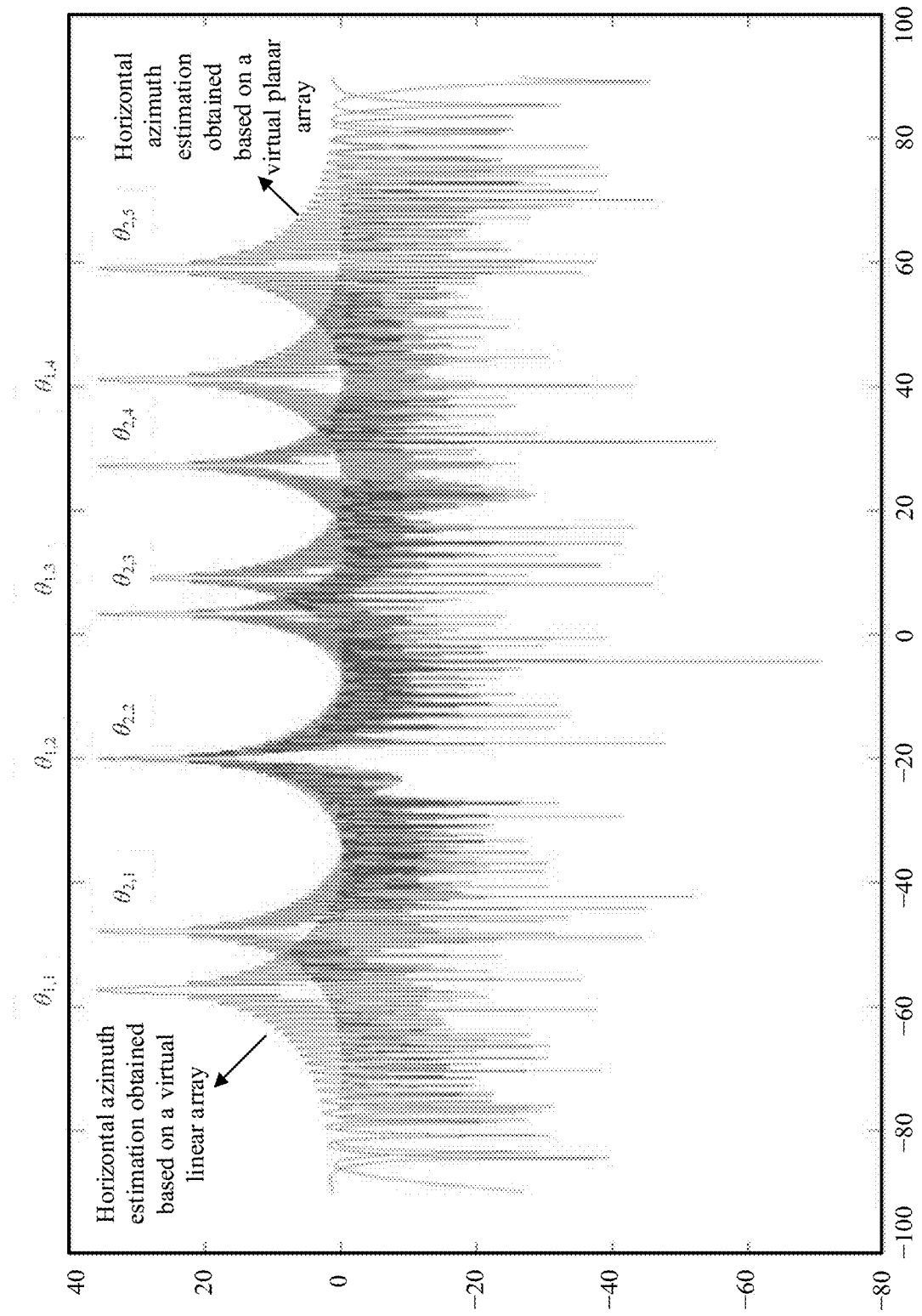
FIG. 12 is a schematic diagram of responses of a second virtual linear array and virtual planar array according to an embodiment of this application.

For example, as shown in FIG. 12, the first candidate horizontal azimuth determined based on the virtual linear array may be $\theta_{1,1}$, $\theta_{1,2}$, $\theta_{1,3}$, and $\theta_{1,4}$, the second candidate horizontal azimuth determined based on the virtual planar array may be $\theta_{2,1}$, $\theta_{2,2}$, $\theta_{2,3}$, $\theta_{2,4}$, and $\theta_{2,5}$, and $\theta_{1,2}$ and $\theta_{2,2}$ coincide. Therefore, the real horizontal azimuth $\theta$ that is of the target and that is determined by using the Chinese remainder theorem is $\theta_{1,2}$ (namely, $\theta_{2,2}$). Then, $\theta$ is substituted into the response matrix of the virtual planar array, to obtain $\phi$. In this way, the two-dimensional angle information $(\theta,\phi)$ of the target can be obtained.

It should be noted that an execution sequence of step 1 and step 2 may be exchanged, or step 1 and step 2 may be processed in parallel. Step 3 needs to be performed after steps 1 and 2 are performed. In addition, the foregoing steps of calculating the horizontal azimuth and the vertical azimuth may be performed independently, or may be performed based on range-velocity map (RD-MAP) that a target may exist on an existed range-velocity cell (RD-CELL) when a range and a velocity of the target are calculated. When the horizontal azimuth and the vertical azimuth are calculated on RD-CELL, if there are a plurality of targets, a probability that a plurality of targets overlap due to angle aliasing is reduced, so that there is a better effect of calculating the horizontal azimuth and the vertical azimuth based on RD-MAP.

If there are a plurality of targets around the radar system 400, when azimuths of two targets cannot be distinguished due to aliasing, matching may be performed by using an RCS or other information.

Further, through calculation based on the virtual linear array and the virtual planar array, if obtained horizontal azimuths of the target include a first horizontal azimuth and a second horizontal azimuth, and vertical azimuths of the target include a first vertical azimuth and a second vertical azimuth, the processing unit 403 is further configured to determine that an RCS corresponding to the first horizontal azimuth is greater than an RCS corresponding to the second horizontal azimuth, determine that an RCS corresponding to the first vertical azimuth is greater than an RCS corresponding to the second vertical azimuth, and determine that the first horizontal azimuth and the first vertical azimuth are a location of a first sub-target in the target, and the second horizontal azimuth and the second vertical azimuth are a location of a second sub-target in the target.

The first sub-target and the second sub-target are two targets that exist around the radar system.

In other words, if two horizontal azimuths and two vertical azimuths are obtained through calculation (in other words, there are two targets), a horizontal azimuth and a vertical azimuth that correspond to a larger RCS are a group, and represent two-dimensional angle information of one of the targets, and a horizontal azimuth and a vertical azimuth that correspond to a smaller RCS are a group, and represent two-dimensional angle information of the other target. Certainly, if there are more than two targets, matching may also be performed in a similar manner. Alternatively, matching may alternatively be performed based on a parameter other than the RCS. This is not limited in this embodiment of this application.

Figure 13:
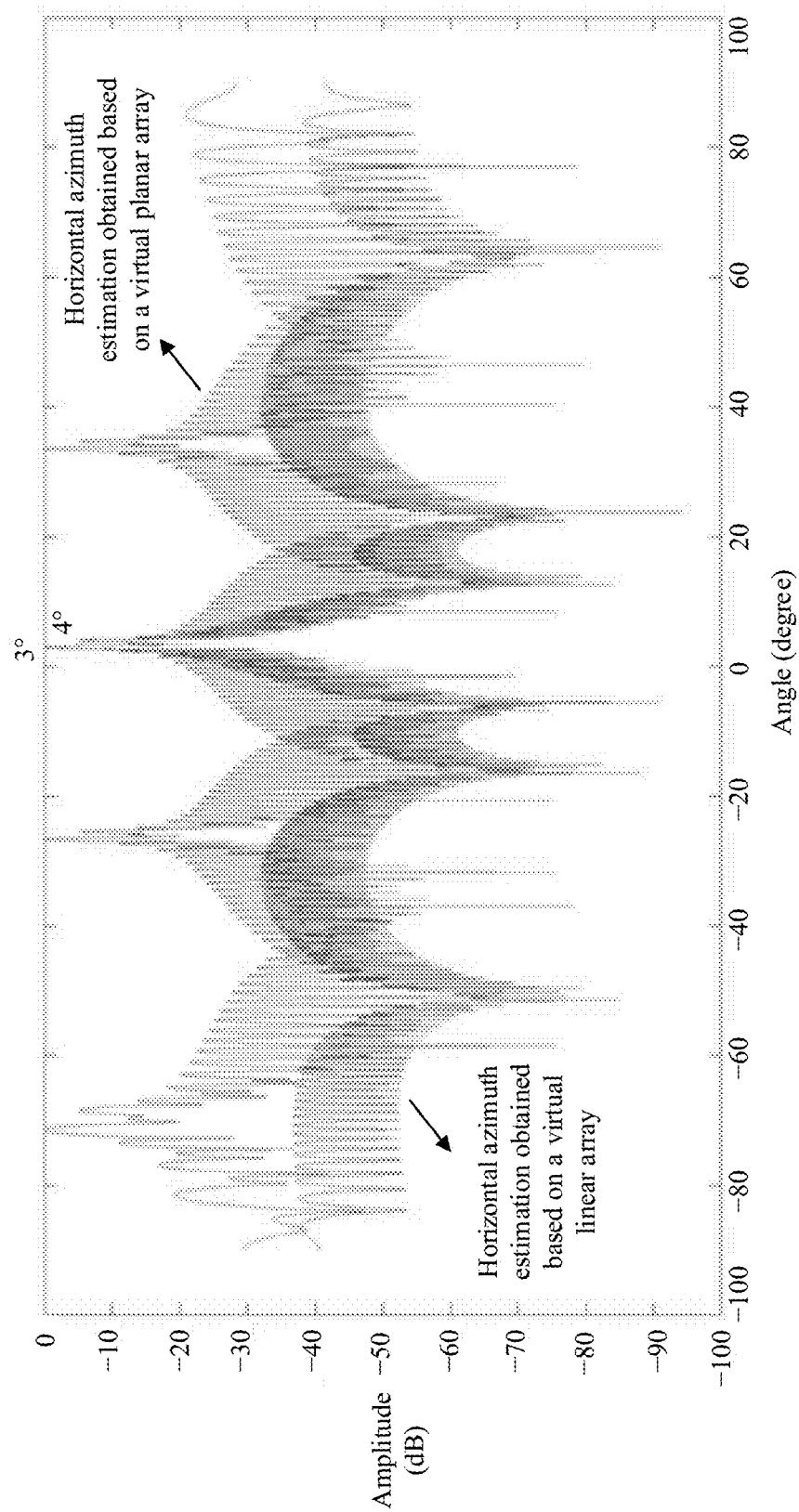
FIG. 13 is a schematic diagram of responses of a third virtual linear array and virtual planar array according to an embodiment of this application.

For example, assuming that two targets exist around the radar system, an antenna array of the radar system is arranged in the arrangement manner shown in FIG. 6, the first candidate horizontal azimuth (namely, a horizontal azimuth estimation result of the target) obtained based on the virtual linear array and the second candidate horizontal azimuth (namely, a horizontal azimuth estimation result of the target) obtained based on the virtual planar array may be shown in FIG. 13. It can be learned from FIG. 13 that there is one target at each of locations whose horizontal azimuths are 3° and 4°, and the targets are respectively referred to as A and B.

Figure 14:
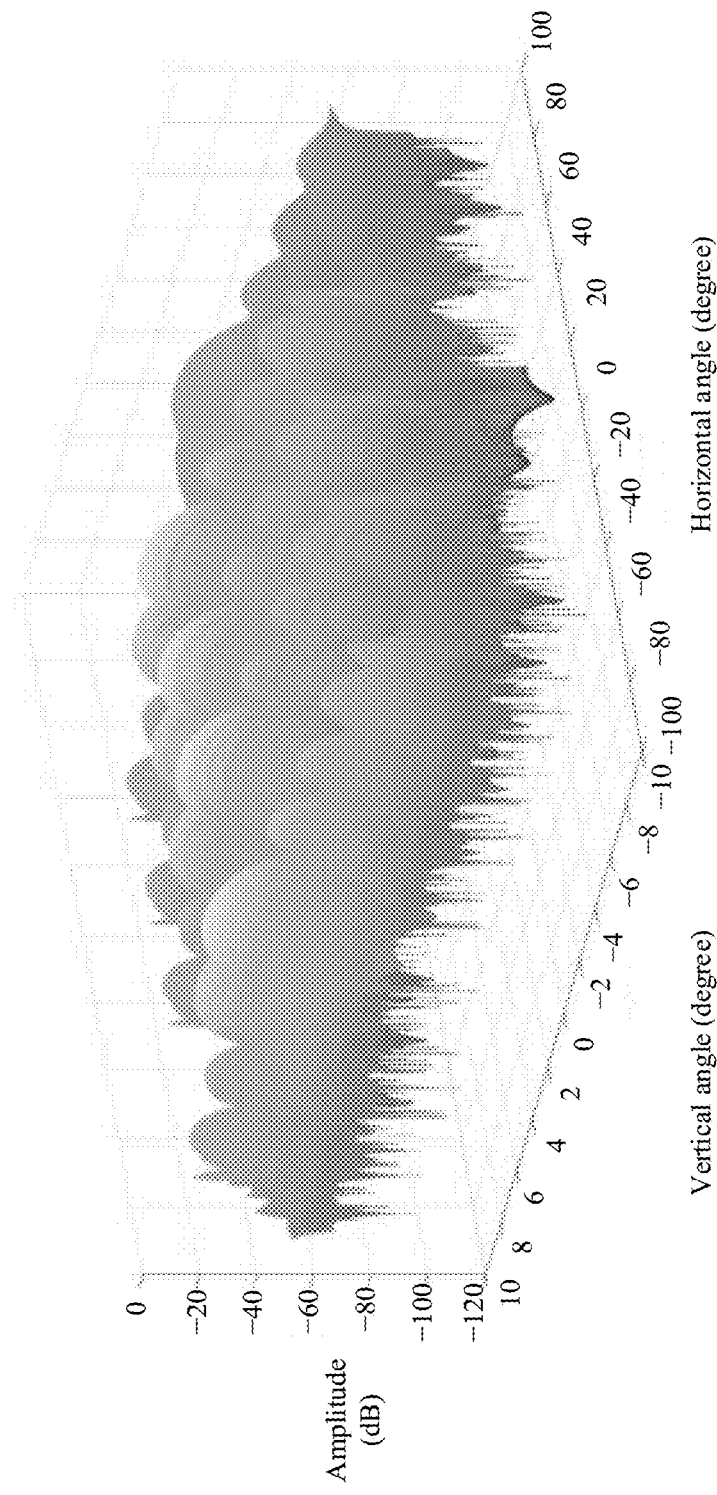
FIG. 14 is a schematic diagram of a response of a first virtual planar array according to an embodiment of this application.
Figure 15:
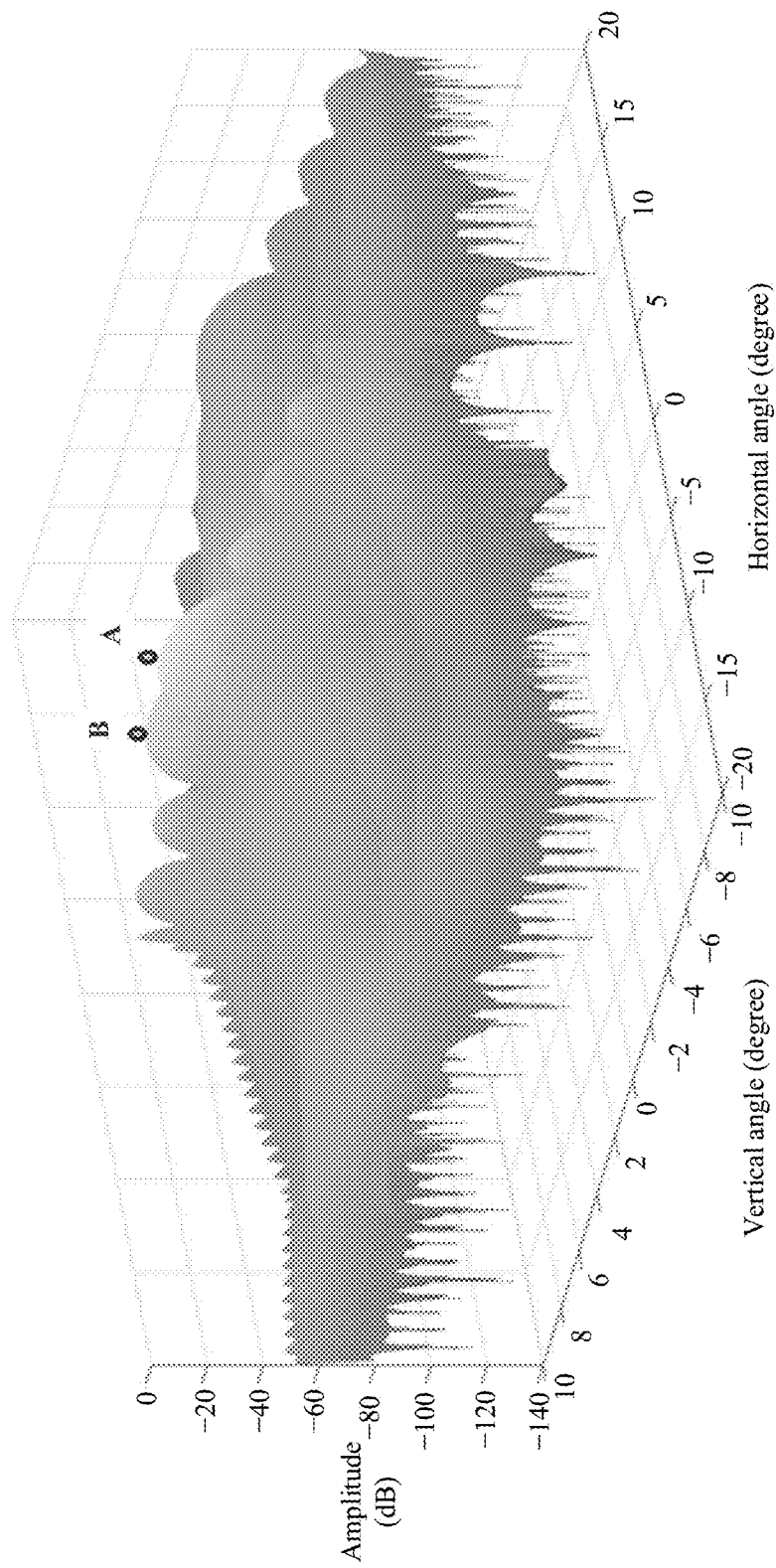
FIG. 15 is a schematic diagram of a response of a second virtual planar array according to an embodiment of this application.

Because apertures of the virtual linear array and the virtual planar array have a same size in the horizontal direction, the virtual linear array and the virtual planar array have same horizontal angular resolution. Therefore, the first candidate horizontal azimuth obtained based on the virtual linear array is substituted into the response matrix of the virtual planar array for vertical angle estimation, to obtain the horizontal azimuth and vertical azimuth corresponding to each target. As shown in FIG. 14, when a response of the virtual planar array is used to calculate a two-dimensional angle, the two targets A and B each have four distinct peak values (corresponding to four distinct peak values in a spectral line of the virtual planar array in FIG. 13). Two-dimensional angle estimation of the target may be completed by using a response of the virtual linear array, as shown in FIG. 15.

Figure 16:
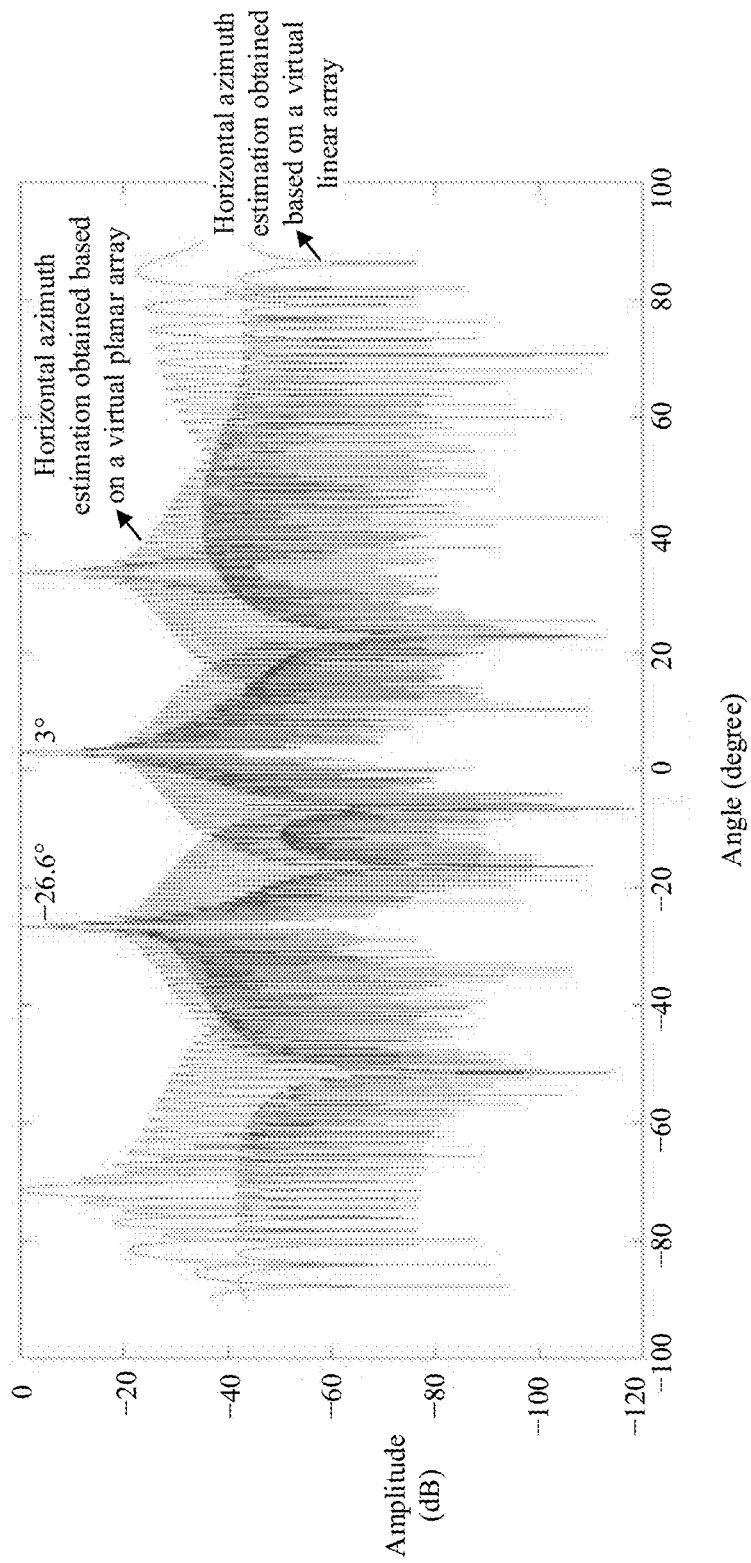
FIG. 16 is a schematic diagram of responses of a fourth virtual linear array and virtual planar array according to an embodiment of this application.
Figure 17:
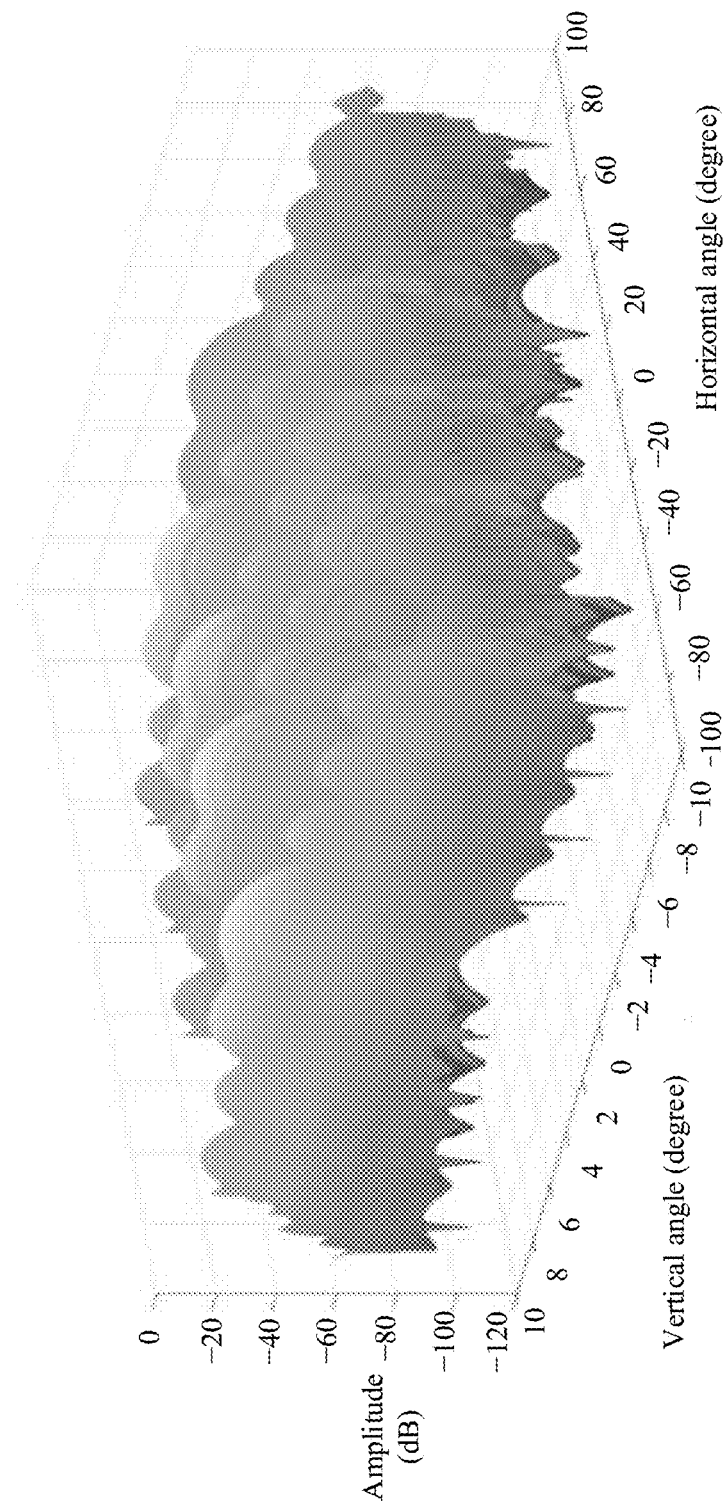
FIG. 17 is a schematic diagram of a response of a third virtual planar array according to an embodiment of this application.

In addition, when an angle difference between the two targets in the horizontal direction is exactly equal to a repetition spacing in the virtual planar array in the horizontal direction (as shown in FIG. 16, horizontal azimuths of the two targets are respectively −26.6° and 3°), if the two angles obtained through calculation based on the virtual linear array are substituted into the response matrix of the virtual planar array for vertical azimuth estimation, two angles are obtained in the vertical direction (as shown in FIG. 17, there are spectral peaks at 2° and 6°). In this case, a correspondence between a horizontal azimuth and a vertical azimuth cannot be distinguished.

Figure 18:
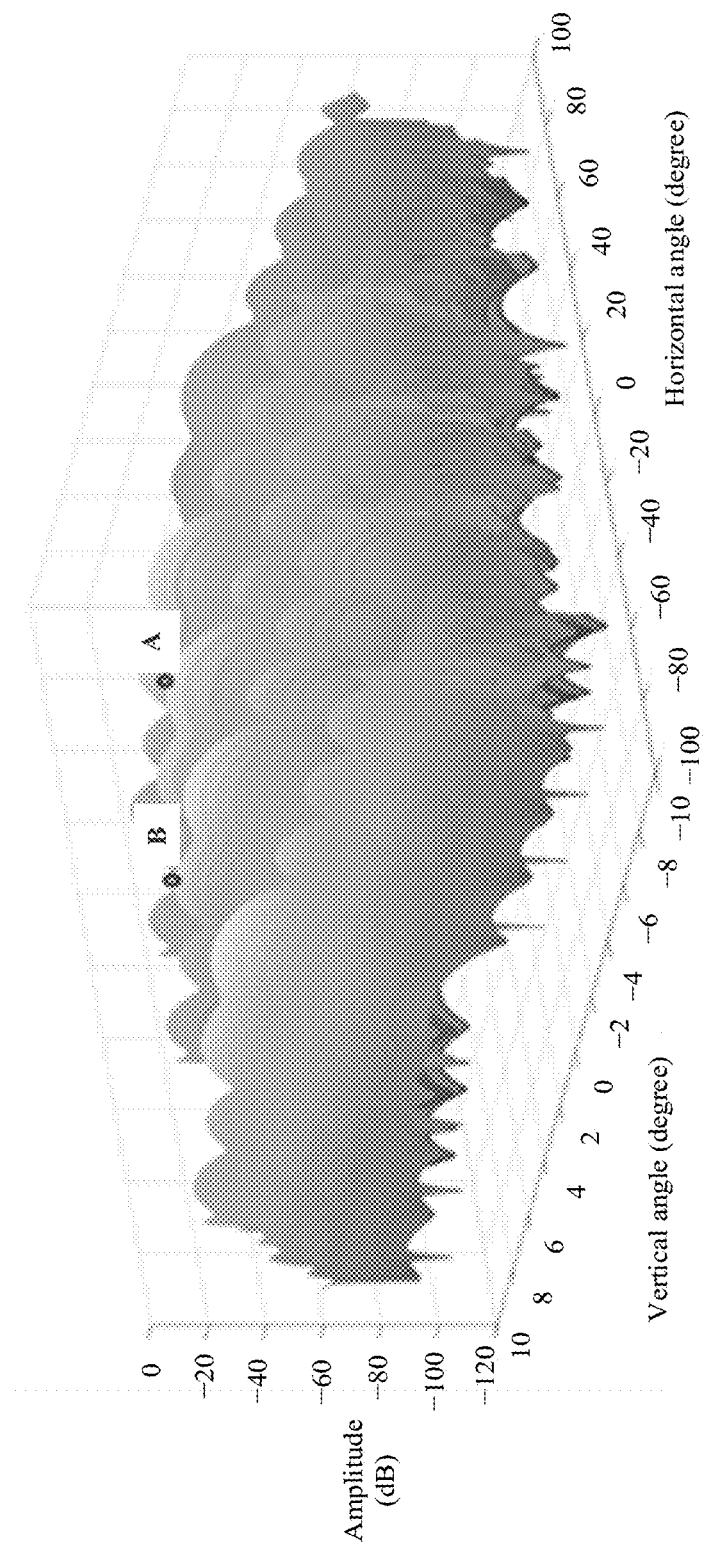
FIG. 18 is a schematic diagram of a response of a fourth virtual planar array according to an embodiment of this application.

In this case, the RCS of the target may be used to match the horizontal azimuth and the vertical azimuth. For example, an RCS of a target with target information of 3° is greater than an RCS of a target with target information of −26.6°, and an RCS of a target with target information of 2° is greater than an RCS of a target with target information of 6°. Therefore, a vertical azimuth of a target A whose horizontal azimuth is 3° is 2°, and a vertical azimuth of a target B whose horizontal azimuth is −26.6° is 6°, as shown in FIG. 18.

Figure 19:
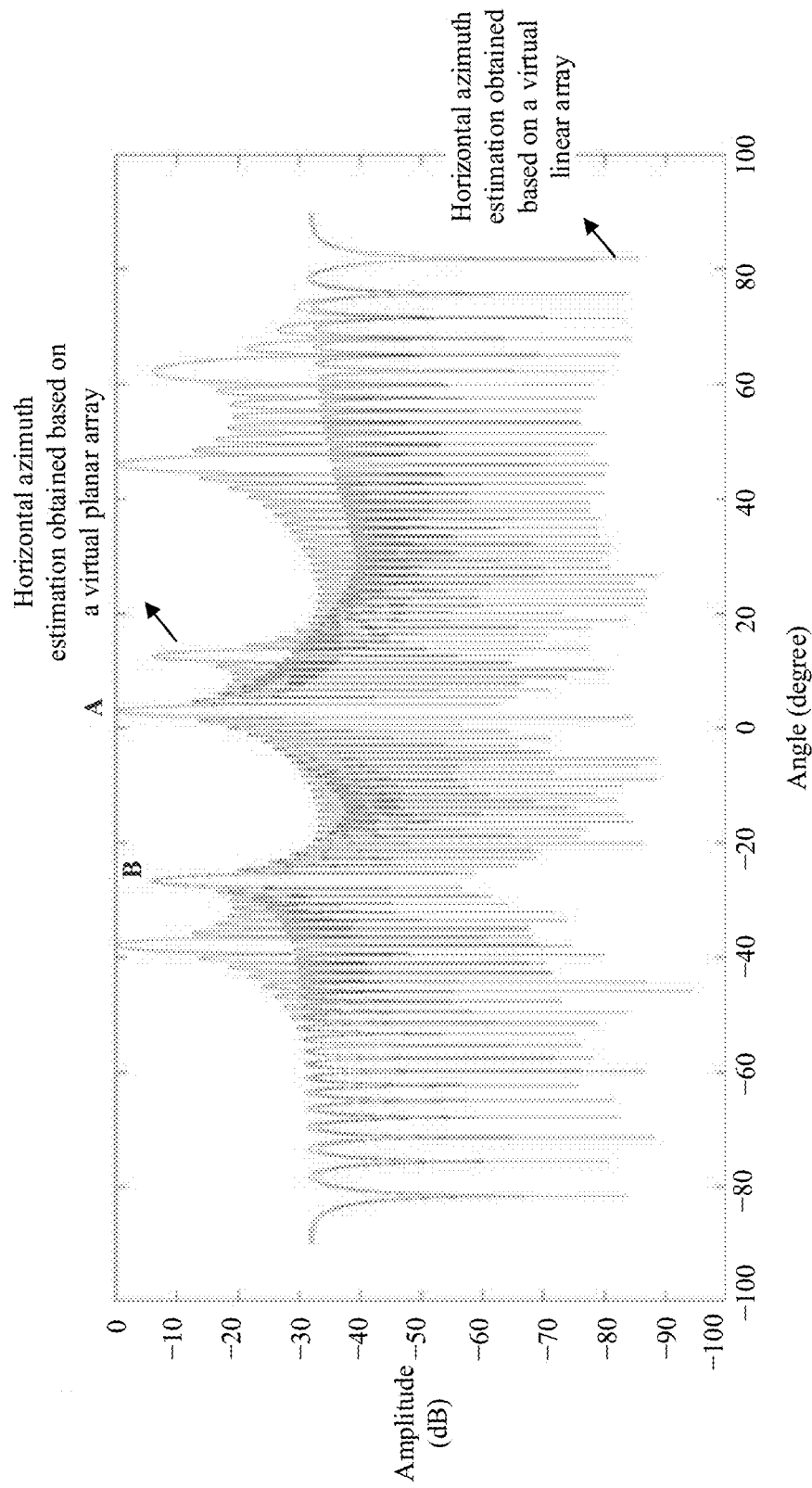
FIG. 19 is a schematic diagram of responses of a fifth virtual linear array and virtual planar array according to an embodiment of this application.

For example, assuming that two targets A and B exist around the radar system, and an antenna array of the radar system is arranged in the arrangement manner shown in FIG. 8, the first candidate horizontal azimuth (namely, the horizontal azimuth estimation result of the target) obtained based on the virtual linear array and the second candidate horizontal azimuth (namely, the horizontal azimuth estimation result of the target) obtained based on the virtual planar array may be shown in FIG. 19.

Figure 20:
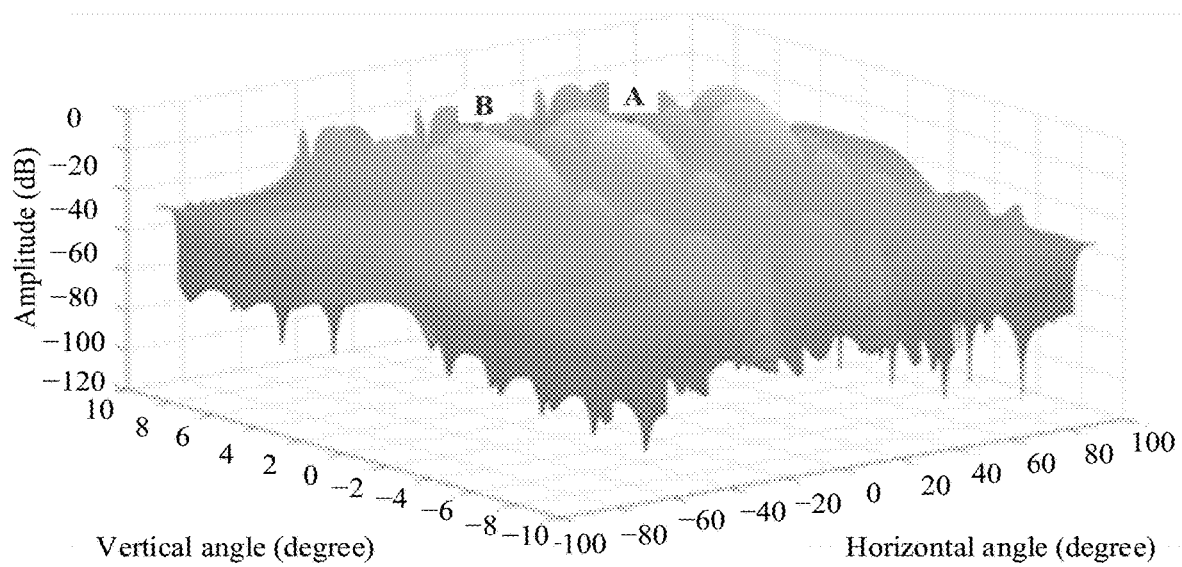
FIG. 20 is a schematic diagram of a response of a fifth virtual planar array according to an embodiment of this application.

Because apertures of the virtual linear array and the virtual planar array have a same size in the horizontal direction, the virtual linear array and the virtual planar array have same horizontal angular resolution. Therefore, the first candidate horizontal azimuth obtained based on the virtual linear array is substituted into the response matrix of the virtual planar array for vertical angle estimation, to obtain the horizontal azimuth and vertical azimuth corresponding to each target. Two-dimensional angle estimation of the target may be completed by using the response of the virtual linear array and the response of the virtual planar array, as shown in FIG. 20.

In conclusion, in the radar system 400 provided in this embodiment of this application, the transmit antenna array of the transmitter 401 and the receive antenna array of the receiver 402 may be used to virtualize one virtual linear array and one virtual planar array. Because a matching degree between the two virtual arrays is more complex than a matching degree between virtual antenna arrays in the conventional technology, a small quantity of antennas may be disposed in the transmitter 401 and the receiver 402, to implement the virtual linear array and the virtual planar array in this application. In addition, because the matching degree between the virtual linear array and the virtual planar array is complex, high angular resolution may be obtained through calculation based on the two arrays. In other words, according to the solution provided in this embodiment of this application, high resolution in the vertical azimuth and the horizontal azimuth of the target may be obtained through calculation by using a small quantity of transmit antennas and a small quantity of receive antennas, so that when angular resolution of the radar system is increased, design and processing difficulty of the antenna array is reduced, and costs of the radar system are reduced.

Figure 21:
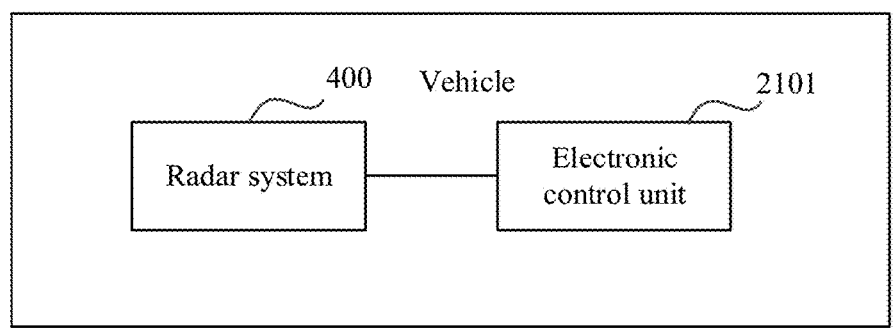
FIG. 21 is a schematic diagram of a structure of a vehicle according to an embodiment of this application.

Based on a same concept, an embodiment of this application further provides a vehicle. As shown in FIG. 21, the vehicle includes a radar system 400 and an electronic control unit (ECU) 2101. The radar system 400 is configured to transmit a radar signal, receive an echo signal obtained after the radar signal is reflected by a target, and determine a horizontal azimuth and a vertical azimuth of the target based on the echo signal, and the ECU 2101 is configured to determine a driving route of the vehicle based on the horizontal azimuth and the vertical azimuth of the target.

It's clear that a person skilled in the art can make various modifications and variations to the embodiments of this application without departing from the scope of this application. This application is intended to cover these modifications and variations of the embodiments of this application provided that they fall within the scope of protection defined by the following claims and their equivalent technologies.

What is claimed is:

1. An antenna comprising:
   a transmit antenna array configured to transmit a radar signal and comprising:
      a first transmit antenna array comprising a plurality of first array elements that are arranged in a first direction, wherein the first direction is a vertical direction;

a second transmit antenna array comprising a plurality of second array elements that are arranged in the first direction;

a third transmit antenna array comprising a plurality of third array elements that are arranged in a second direction, wherein the second direction is a horizontal direction, wherein a first quantity of the first array elements is greater than a second quantity of the third array elements, wherein a third quantity of the third array elements of the third transmit antenna array in the second direction is greater than a fourth quantity of the first array elements of the first transmit antenna array in the second direction, and wherein the first direction is perpendicular to the second direction; and a fourth transmit antenna array comprising a plurality of fourth array elements that are arranged in the second direction, wherein a fifth quantity of the second array elements is greater than a sixth quantity of the fourth array elements, and wherein a seventh quantity of the fourth array elements of the fourth transmit antenna array in the second direction is greater than an eighth quantity of the second array elements of the second transmit antenna array in the second direction; and at least one receive antenna array configured to receive an echo signal of the radar signal that is reflected from a target, wherein the receive antenna array is arranged in a single line in the horizontal direction, wherein the transmit antenna array and the receive antenna array form a virtual linear array and a virtual planar array, and wherein, in the second direction, virtual array elements of the virtual linear array are more densely packed than virtual array elements of the virtual planar array.

2. The antenna of claim 1, wherein the transmit antenna array comprises a vertical transmit antenna array and a horizontal transmit antenna array.

3. The antenna of claim 2, wherein the vertical transmit antenna array comprises the first transmit antenna array that is arranged on a first side of the at least one receive antenna array, wherein the first transmit antenna array comprises the plurality of first array elements that are arranged in the vertical direction, wherein the horizontal transmit antenna array comprises the third transmit antenna array that is adjacent to the first transmit antenna array, and wherein the third transmit antenna array comprises the plurality of third array elements that are arranged in the horizontal direction.

4. The antenna of claim 3, wherein the vertical transmit antenna array further comprises the second transmit antenna array that is arranged on a second side of the at least one receive antenna array, wherein the second transmit antenna array comprises the plurality of second array elements that are arranged in the vertical direction, wherein the horizontal transmit antenna array further comprises the fourth transmit antenna array that is adjacent to the second transmit antenna array, and wherein the fourth transmit antenna array comprises the plurality of fourth array elements that are arranged in the horizontal direction.

5. The antenna of claim 2, wherein the horizontal transmit antenna array and the receive antenna array are configured to form the virtual linear array, and wherein the vertical transmit antenna array and the receive antenna array are configured to form the virtual planar array.

6. The antenna of claim 1, wherein the third transmit antenna array is adjacent to the first transmit antenna array.

7. The antenna of claim 3, wherein the first side is an outside of the at least one receive antenna array.

8. The antenna of claim 1, wherein, in the second direction, an aperture size of the virtual linear array is the same as an aperture size of the virtual planar array.

9. A radar system comprising:
an antenna comprising:
a transmit antenna array configured to transmit a radar signal and comprising:
a first transmit antenna array comprising a plurality of first array elements that are arranged in a first direction, wherein the first direction is a vertical direction;
a second transmit antenna array comprising a plurality of second array elements that are arranged in the first direction;
a third transmit antenna array comprising a plurality of third array elements that are arranged in a second direction, wherein the second direction is a horizontal direction, wherein a first quantity of the first array elements is greater than a second quantity of the third array elements, wherein a third quantity of the third array elements of the third transmit antenna array in the second direction is greater than a fourth quantity of the first array elements of the first transmit antenna array in the second direction, and wherein the first direction is perpendicular to the second direction; and
a fourth transmit antenna array comprising a plurality of fourth array elements that are arranged in the second direction, wherein a fifth quantity of the second array elements is greater than a sixth quantity of the fourth array elements, and wherein a seventh quantity of the fourth array elements of the fourth transmit antenna array in the second direction is greater than an eighth quantity of the second array elements of the second transmit antenna array in the second direction; and
at least one receive antenna array configured to receive an echo signal of the radar signal that is reflected from a target, wherein the receive antenna array is arranged in a single line in the horizontal direction, wherein the transmit antenna array and the receive antenna array form a virtual linear array and a virtual planar array, and wherein, in the second direction, virtual array elements of the virtual linear array are more densely packed than virtual array elements of the virtual planar array; and
a processor coupled to the antenna and configured to process the echo signal.

10. The radar system of claim 9, wherein the processor is further configured to:
determine, based on the echo signal and the virtual linear array, a first observation result of the radar signal;
determine, based on the echo signal and the virtual planar array, a second observation result of the radar signal; and
determine a horizontal azimuth and a vertical azimuth of the target based on the first observation result and the second observation result.

11. The radar system of claim 10, wherein the processor is further configured to:
determine a first candidate horizontal azimuth of the target based on the first observation result;

determine a second candidate horizontal azimuth of the target and a candidate vertical azimuth of the target based on the second observation result;

further determine the horizontal azimuth based on the first candidate horizontal azimuth; and further determine the vertical azimuth based on the second candidate horizontal azimuth and the candidate vertical azimuth.

12. The radar system of claim 10, wherein the horizontal azimuth comprises a first horizontal azimuth and a second horizontal azimuth, wherein the vertical azimuth comprises a first vertical azimuth and a second vertical azimuth, and wherein the processor is further configured to:

determine that a first radar cross-section (RCS) corresponding to the first horizontal azimuth is greater than a second RCS corresponding to the second horizontal azimuth;

determine that a third RCS corresponding to the first vertical azimuth is greater than a fourth RCS corresponding to the second vertical azimuth;

determine that the first horizontal azimuth and the first vertical azimuth are a first location of a first sub-target in the target; and determine that the second horizontal azimuth and the second vertical azimuth are a second location of a second sub-target in the target.

13. The radar system of claim 9, wherein the radar signal is any one of a frequency-modulated continuous-wave (FMCW) signal, a multiple frequency-shift keying (MFSK) signal, or a phase-modulated continuous-wave (PMCW) signal.

14. A vehicle comprising:
a radar system comprising:
an antenna comprising:
a transmit antenna array configured to transmit a radar signal and comprising:
a first transmit antenna array comprising a plurality of first array elements that are arranged in a first direction, wherein the first direction is a vertical direction;
a second transmit antenna array comprising a plurality of second array elements that are arranged in the first direction;
a third transmit antenna array comprising a plurality of third array elements that are arranged in a second direction, wherein the second direction is a horizontal direction, wherein a first quantity of the first array elements is greater than a second quantity of the third array elements, wherein a third quantity of the third array elements of the third transmit antenna array in the second direction is greater than a fourth quantity of the first array elements of the first transmit antenna array in the second direction, and wherein the first direction is perpendicular to the second direction; and a fourth transmit antenna array comprising a plurality of fourth array elements that are arranged in the second direction, wherein a fifth quantity of the second array elements is greater than a sixth quantity of the fourth array elements, and wherein a seventh quantity of the fourth array elements of the fourth transmit antenna array in the second direction is greater than an eighth quantity of the second array elements of the second transmit antenna array in the second direction; and at least one receive antenna array configured to receive an echo signal of the radar signal that is reflected from a target, wherein the receive antenna array is arranged in a single line in the horizontal direction, wherein the transmit antenna array and the receive antenna array form a virtual linear array and a virtual planar array, and wherein, in the second direction, first virtual array elements of the virtual linear array are more densely packed than second virtual array elements of the virtual planar array; and a processor coupled to the antenna and configured to process the echo signal.

15. The antenna of claim 1, wherein the fourth transmit antenna array is adjacent to the second transmit antenna array.

16. The antenna of claim 4, wherein the second side is an outside of the at least one receive antenna array.

17. The antenna of claim 1, wherein elements of the transmit antenna array are located on two sides of the at least one receive antenna array.

18. The antenna of claim 1, wherein elements of the transmit antenna array are symmetrical along the at least one receive antenna array.

19. The vehicle of claim 14, wherein the transmit antenna array comprises a vertical transmit antenna array and a horizontal transmit antenna array.

20. The vehicle of claim 14, wherein, in the second direction, a first angular resolution of the virtual linear array is higher than a second angular resolution of the virtual planar array when a first aperture of the virtual linear array is greater than a second aperture of the virtual planar array, and wherein the first angular resolution comprises first angular information in the second direction that can be substituted into virtual planar array to obtain angle information in the first direction.

* * * * *